United States Patent
Yoon et al.

(10) Patent No.: US 9,743,134 B2
(45) Date of Patent: Aug. 22, 2017

(54) BROADCAST RECEPTION DEVICE, OPERATING METHOD OF BROADCAST RECEPTION DEVICE, CONDITIONAL ACCESS MODULE AND OPERATING METHOD OF CONDITIONAL ACCESS MODULE

(71) Applicant: LG ELECTRONICS INC., Seoul (KR)

(72) Inventors: Joonhee Yoon, Seoul (KR); Kyounghwan Kim, Seoul (KR); Youngjun Jo, Seoul (KR); Jongyeul Suh, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 84 days.

(21) Appl. No.: 14/743,651

(22) Filed: Jun. 18, 2015

(65) Prior Publication Data
US 2015/0373403 A1   Dec. 24, 2015

Related U.S. Application Data

(60) Provisional application No. 62/014,116, filed on Jun. 19, 2014, provisional application No. 62/014,671, (Continued)

(51) Int. Cl.
*H04N 7/167* (2011.01)
*H04N 21/4405* (2011.01)
(Continued)

(52) U.S. Cl.
CPC ..... *H04N 21/4405* (2013.01); *H04N 21/2347* (2013.01); *H04N 21/4181* (2013.01); *H04N 21/442* (2013.01); *H04N 21/4882* (2013.01)

(58) Field of Classification Search
CPC .................................................. H04N 21/4181
See application file for complete search history.

(56) References Cited

U.S. PATENT DOCUMENTS 8,160,424 B2 *  4/2012  Cha .................. H04N 5/765
                                                            348/E7.054
2007/0101399 A1   5/2007  Yun
(Continued)

FOREIGN PATENT DOCUMENTS

EP          2 725 813 A2    4/2014
WO     WO 2011/019224 A2    2/2011

OTHER PUBLICATIONS

DVB, "Commercial Requirements for DVB CI Plus V2.0," DVB Document CM-CI-Plus0157r3, Feb. 10, 2014, XP17843001A, pp. 1-9.
(Continued)

*Primary Examiner* — Gigi L Dubasky
(74) *Attorney, Agent, or Firm* — Birch, Stewart, Kolasch & Birch, LLP

(57) ABSTRACT

A broadcast reception device is provided. The broadcast reception device includes a communication interface unit receiving, from a CAM, a first data unit including a request for diagnostic information for representing a status of the broadcast reception device; and a control unit generating a second data unit including a reply to the first data unit to transmit the second data unit to the CAM through the communication interface unit, wherein the second data unit includes information representing that the broadcast reception device does not implement displaying of a diagnostic information related screen.

12 Claims, 38 Drawing Sheets

Related U.S. Application Data filed on Jun. 19, 2014, provisional application No. 62/025,494, filed on Jul. 17, 2014.

(51) Int. Cl.
  *H04N 21/418* (2011.01)
  *H04N 21/442* (2011.01)
  *H04N 21/2347* (2011.01)
  *H04N 21/488* (2011.01)

(56) References Cited

U.S. PATENT DOCUMENTS

| | | | |
|---|---|---|---|
| 2012/0144441 | A1 | 6/2012 | Yun et al. |
| 2013/0073694 | A1 | 3/2013 | Sarosi |
| 2013/0283327 | A1 | 10/2013 | Kwon |
| 2014/0123171 | A1 | 5/2014 | Woo |
| 2015/0341630 | A1* | 11/2015 | Zheng .................... H04N 17/04 348/189 |

OTHER PUBLICATIONS

ETSI, "Digital Video Broadcasting (DVB); Extensions to the CI Plus™ Specification," ETSI TS 103 205 V1.1.1, Mar. 2014, XP55132694A, pp. 1-154.

ETSI, "Digital Video Broadcasting (DVB); Second Generation Common Interface (CI); Part 2: Extensions to the CI Plus Specification," ETSI TS 1xx xxx-2 V1.1.1, Oct. 2014, XP17845647A, pp. 1-20.

* cited by examiner

FIG.3

| Name | Resource ID | Class | Type | Version |
|---|---|---|---|---|
| Resource Manager | 00 01 00 42 | 1 | 1 | 2 |
| Application Information | 00 02 00 44 | 2 | 1 | 4 |
| Conditional Access Support | 00 03 00 81 | 3 | 2 | 1 |
| Host Control | 00 20 00 81 | 32 | 2 | 1 |
| Date-Time | 00 24 00 41 | 36 | 1 | 1 |
| MMI | 00 40 00 81 | 64 | 2 | 1 |
| low speed comms. | 00 60 xx x4 | 96 | | 4 |
| Content Control | 00 8C 10 41 | 140 | 65 | 1 |
| Host Language & Country | 00 8D 10 01 | 141 | 64 | 1 |
| CICAM_Upgrade | 00 8E 10 01 | 142 | 64 | 1 |
| Operator Profile | 00 8F 10 02 | 143 | 64 | 2 |
| SAS | 00 96 10 01 | 150 | 64 | 1 |
| Application MMI | 0 41 00 81 | 65 | 2 | 1 |
| Multi-stream | 00 90 00 41 | 144 | 1 | 1 |
| Auxiliary File System | 00 91 00 41 | 145 | 1 | 1 |
| Sample Decryption | 00 92 00 41 | 146 | 1 | 1 |
| CICAM Player | 00 93 00 41 | 147 | 1 | 1 |

FIG.4

| APDU Tag | Tag value (3 bytes) | Description | Direction CAM | Direction Host |
|---|---|---|---|---|
| CLOSE_MMI | 9F 88 00 | CURRENTLY DISPLAYED MMI CLOSES | < | - |
| DISPLAY_CONTROL | 9F 88 01 | CAM REQUESTS GRAPHIC AND DISPLAY INFORMATION FROM HOST | - | > |
| DISPLAY_REPLY | 9F 88 02 | REPLY TO DISPLAY_CONTROL FROM HOST | < | - |
| TEXT | 9F 88 03 | USED AS PORTION OF ANOTHER OBJECT AND HAVING TEXT STRING | - | > |
| ENQ | 9F 88 07 | CAM USES TO RECEIVE USE INPUT | - | > |
| ANSW | 9F 88 08 | IN ANSWER TO ENQ FROM HOST, USER INPUT IS TRANSMITTED | < | - |
| MENU | 9F 88 09 | OBJECT THAT MAY LIST MANY ITEMS AND ENABLE USER TO SELECT ONE OF THEM | - | > |
| MENU_ANSW | 9F 88 0B | IN ANSWER TO MENU, USER TRANSMITS TO CAM ITEM SELECTED BY USER | < | - |
| LIST | 9F 88 0C | HAVING SAME FORMAT AS MENU BUT USER HAS NO OPTION TO SELECT | - | > |

FIG.11

| Syntax | No. of bits | Mnemonic |
|---|---|---|
| menu(){ | | |
|     menu_tag | 24 | uimsbf |
|     length_field() | | |
|     page_number | 8 | uimsbf |
|     timeout | 24 | uimsbf |
|     reserved | 7 | bslbf |
|     LTS_bound_flag | 1 | bslbf |
|     if (LTS_bound_flag == 1) { | | |
|         LTS_id | 8 | uimsbf |
|     }else { | | |
|         reserved | 8 | uimsbf |
|     } | | |
|     choice_nb | 8 | uimsbf |
|     TEXT() | | |
|     TEXT() | | |
|     TEXT() | | |
|     for (i=0;i<choice_nb;i ++) | | |
|         TEXT() | | |
| } | | |

FIG.13

| Syntax | No. of bits | Mnemonic |
|---|---|---|
| menu_answ(){ |  |  |
|     menu_reply_tag | 24 | uimsbf |
|     length_field() |  |  |
|     page_number | 8 | uimsbf |
|     choice_ref | 8 | uimsbf |
| } |  |  |

FIG.15

| Syntax | No. of bits | Mnemonic |
|---|---|---|
| list_reply(){ | | |
|     list_reply_tag | 24 | uimsbf |
|     length_field() | | |
|     list_status | 8 | uimsbf |
|     page_number | 8 | uimsbf |
| } | | |

| list_status | value |
|---|---|
| success(done) | 01 |
| processing | 02 |
| fail | 03 |
| reserved | other values |

FIG.17

| Syntax | No. of bits | Mnemonic |
|---|---|---|
| list(){ | | |
|     list_tag | 24 | uimsbf |
|     length_field() | | |
|     page_number | 8 | uimsbf |
|     timeout | 24 | uimsbf |
|     reserved | 7 | bslbf |
|     LTS_bound_flag | 1 | bslbf |
|     if(LTS_bound_flag == 1) { | | |
|         LTS_id | 8 | uimsbf |
|     }else { | | |
|         reserved | 8 | uimsbf |
|     } | | |
|     item_nb | 8 | uimsbf |
|     TEXT() | | |
|     TEXT() | | |
|     TEXT() | | |
|     for (i=0;i<item_nb;i++) | | |
|         TEXT() | | |
| } | | |

FIG.19

| Syntax | No. of bits | Mnemonic |
|---|---|---|
| enq_reply(){ | | |
|     enq_reply_tag | 24 | uimsbf |
|     length_field() | | |
|     enq_status | 8 | uimsbf |
|     page_number | 8 | uimsbf |
| } | | |

| enq_status | value |
|---|---|
| success(done) | 01 |
| processing | 02 |
| fail | 03 |
| reserved | other values |

FIG.21

Syntax

| Syntax | No. of bits | Mnemonic |
|---|---|---|
| enq(){ | | |
|     enq_tag | 24 | uimsbf |
|     length_field() | 8 | uimsbf |
|     timeout | 24 | uimsbf |
|     reserved | 6 | bslbf |
|     LTS_bound_flag | 1 | bslbf |
|     blind_answer | 1 | bslbf |
|     if(LTS_bound_flag== 1) { | | |
|         LTS_id | 8 | uimsbf |
|     }else { | | |
|         reserved | 8 | uimsbf |
|     } | | |
|     answer_text_length | 8 | uimsbf |
|     for(i=0; i<enq_length2; i++) | | |
|         text_char | 8 | uimsbf |
| } | | |

FIG.23

| Syntax | No. of bits | Mnemonic |
|---|---|---|
| answ(){ | | |
|     answ_tag | 24 | uimsbf |
|     length_field() | | |
|     page_number | 8 | uimsbf |
|     answ_id | 8 | uimsbf |
|     if(answ_id ==answer){ | | |
|         for(i=0;i<length;i++) | | |
|             text_char | 8 | uimsbf |
|     } | | |
| } | | |

FIG.25

| Resource | | | | | Application Object | | Direction | |
|---|---|---|---|---|---|---|---|---|
| Name | Resource ID | Class | Type | Version | APDU Tag | Tag value | CAM | Host |
| ... | ... | ... | ... | ... | ... | ... | ... | |
| CICAM Player | 00 93 00 41 | 147 | 1 | 1 | CICAM_player_verify_req | 9F A0 00 | <- | |
| | | | | | CICAM_player_verify_reply | 9F A0 01 | -> | |
| | | | | | CICAM_player_capabilities_req | 9F A0 02 | -> | |
| | | | | | CICAM_player_capabilities_reply | 9F A0 03 | <- | |
| | | | | | ... | ... | | |
| | | | | | CICAM_player_session_end | 9F A0 0C | -> | |
| | | | | | CICAM_player_asset_end | 9F A0 0D | -> | |
| Diagnostic Information | 00 94 00 41 | 148 | 1 | 1 | diagnostic_info_enq | 9F A1 01 | -> | |
| | | | | | diagnostic_info | 9F A1 02 | <- | |

FIG.27

| Syntax | No. of bits | Mnemonic |
|---|---|---|
| diagnostic_info_enq(){ | | |
|     diagnostic_info_enq_tag | 24 | uimsbf |
|     length_field()=0 | | |
| } | | |

FIG.29

| Syntax | No. of bits | Mnemonic |
|---|---|---|
| diagnostic_info (){ | | |
|     diagnostic_info_tag | 24 | uimsbf |
|     length_field() | | |
|     screen_support_answ | 8 | uimsbf |
|     signal_strength | 8 | uimsbf |
|     signal_quality | 16 | uimsbf |
|     video_check | 8 | uimsbf |
|     audio_check | 8 | uimsbf |
|     network_check | 8 | uimsbf |
| } | | |

FIG.30

| Resource | | | | | Application Object | | Direction | |
|---|---|---|---|---|---|---|---|---|
| Name | Resource ID | Class | Type | Version | APDU Tag | Tag value | CAM | Host |
| MMI | 00 40 00 81 | 64 | 2 | 1 | close_mmi | 9F 88 00 | <- | |
| | | | | | display_control | 9F 88 01 | -> | |
| | | | | | display_reply | 9F 88 02 | <- | |
| | | | | | enq | 9F 88 07 | -> | |
| | | | | | answ | 9F 88 08 | <- | |
| | | | | | menu_last | 9F 88 09 | -> | |
| | | | | | menu_more | 9F 88 0A | -> | |
| | | | | | menu_answ | 9F 88 0B | <- | |
| | | | | | list_last | 9F 88 0C | -> | |
| | | | | | list_more | 9F 88 0D | -> | |
| | 00 40 00 82 | 64 | 3 | 1 | diagnostic_info_enq | 9F 88 18 | -> | |
| | | | | | diagnostic_info | 9F 88 19 | <- | |

BROADCAST RECEPTION DEVICE, OPERATING METHOD OF BROADCAST RECEPTION DEVICE, CONDITIONAL ACCESS MODULE AND OPERATING METHOD OF CONDITIONAL ACCESS MODULE

CROSS REFERENCE TO RELATED APPLICATIONS

This non-provisional application claims the benefit under 35 U.S.C. §119(e) to U.S. Provisional Application Nos. 62/014,116 filed on Jun. 19, 2014; 62/014,671 filed on Jun. 19, 2014; and 62/025,494 filed on Jul. 17, 2014, all of which are hereby expressly incorporated by reference into the present application.

BACKGROUND

The present disclosure relates to a broadcast reception device, an operating method of a broadcast reception device, a conditional access module and an operating method of an conditional access module.

A broadcaster scrambles content and then transmits scrambled content in order to provide the content to only viewers who has paid license fee, and a broadcast reception device descrambles the scrambled content and then provides the descrambled content to a viewer. Such a broadcasting system is referred to as a conditional access system (CAS). The particular operation method of the CAS varies according to a CAS provider providing the CAS. Thus, in order for the broadcast reception device to provide a CAS from a specific provider, the broadcast reception device should implement both particular functions and operation methods that a corresponding provider requires. Also, there is a need to obtain, from the corresponding provider, certification that operations required by a corresponding provider are all performed. Thus, it is difficult from the broadcast reception device to provide CASs from many providers. In order to solve such a limitation, a conditional access module (CAM) and a common interface (CI) are used.

The CAM is a module descrambling broadcast content scrambled according to the CAS of an individual provider. The CI is an interface through which the broadcast reception device and the CAM are connected. When the broadcast reception device includes a CI slot to which the CAM is connected, a user may connect, to the CI slot, the CAM that may descramble broadcast content attempting to view. Accordingly, the broadcast reception device may implement only the CI capable of being linked to the CAM without a need to implement all operations required by the CAM of an individual provider, descramble scrambled broadcast content and provide the descrambled content to a viewer.

In general, an interface among a computer, machine, system and a man using them is referred to as a man machine interface (MMI). The MMI includes all of visual, auditory, and tactile ones. Also, the MMI interface includes computer control commands, communication technologies, or physical elements that may operate the computer. Also, the MMI may include an input device and an output device in addition to a graphic user interface (GUI).

Such a MMI may link the CAM to the man. In particular, the MMI may be a specific screen for receiving a user input. In this case, it is possible to identify the MMI according to who determines the display method of the MMI. Particular embodiments are described below.

SUMMARY

Embodiments provide a broadcast reception device, an operating method of the broadcast reception device, a conditional access module (CAM) and an operating method of the CAM that manage state information on a man machine interface (MMI).

Embodiments also provide a broadcast reception device, an operating method of the broadcast reception device, a conditional access module (CAM) and an operating method of the CAM that transmit state information on the broadcast reception device to the CAM.

Embodiments particularly provide a CAM and an operating method of the CAM that check whether it is possible to display, on a broadcast reception device, state information on the broadcast reception device.

In one embodiment, a broadcast reception device includes a communication interface unit receiving, from a CAM, a first data unit including a request for diagnostic information for representing a status of the broadcast reception device; and a control unit generating a second data unit including a reply to the first data unit to transmit the second data unit to the CAM through the communication interface unit, wherein the second data unit includes information representing that the broadcast reception device does not implement displaying of a diagnostic information related screen.

The request for the diagnostic information may include requesting the broadcast reception device to display the diagnostic information related screen, and the reply to the first data unit may include information on a showing status of the diagnostic information related screen shown by the broadcast reception device.

The information on the showing status may be at least one of information representing that the broadcast reception device is displaying the diagnostic information related screen and information representing that the broadcast reception device is not displaying the diagnostic information related screen.

Data for a diagnostic information request may include a command related to the displaying of a screen including diagnostic information.

The reply to the first data unit may include system diagnosis information on the broadcast reception device, and the system diagnosis information on the broadcast reception device may be at least one of strength information on a signal that the broadcast reception device receives, quality information on the signal that the broadcast reception device receives, video system status information on the broadcast reception device, audio system status information on the broadcast reception device, and network status information on the broadcast reception device.

The communication interface unit may receive a third data unit including data for a request for displaying of a plurality of items from the CAM, and the control unit may receive a user input for a reply to the third data unit and transmit a fourth data unit including the received user input to the CAM through the communication interface unit.

The user input may be an input selecting diagnostic information.

A session between the broadcast reception device and the CAM for transmitting and receiving the first data unit and the second data unit may be the same as a session between the broadcast reception device and the CAM for transmitting and receiving the third data and the fourth data.

A session between the broadcast reception device and the CAM for transmitting and receiving the first data unit and the second data unit may be different from a session between the broadcast reception device and the CAM for transmitting and receiving the third data and the fourth data.

The first data unit may further include data for requesting information on a processing status of a function requested to be processed by the CAM, and the second data unit may further include information on a processing status of a function requested to be processed by the CAM.

The processing status information on the function requested to be processed by the CAM may be at least one of information representing that the broadcast reception device has succeeded in processing the function requested to be processed by the CAM, information representing that the broadcast reception device is processing the function requested to be processed by the CAM, and information representing that the broadcast reception device fails to process the function requested to be processed by the CAM.

In another embodiment, an operating method of a broadcast reception device according to an embodiment includes receiving, from a CAM, a first data unit including a request for diagnostic information for representing a status of the broadcast reception device; and generating a second data unit including a reply to the first data unit to transmit the second data unit to the CAM, wherein the second data unit includes information representing that the broadcast reception device does not implement displaying of a diagnostic information related screen.

In further another embodiment, a CAM connected to a broadcast reception device receiving a broadcast signal transmits a first data unit including a request for diagnostic information for representing a status of the broadcast reception device and receives a second data unit including a reply to the first data unit, wherein the second data unit includes information representing whether the broadcast reception device does not implement the displaying of a diagnostic information related screen.

The details of one or more embodiments are set forth in the accompanying drawings and the description below. Other features will be apparent from the description and drawings, and from the claims.

BRIEF DESCRIPTION OF THE DRAWINGS

FIGS. 2 to 3 are diagrams for schematically explaining a resource that the CAM and the broadcast reception device according to an embodiment transmit and receive.

FIG. 4 represents an object according to a high-level man machine interface (MMI).

FIGS. 8 to 13 represent another embodiment for solving a limitation that may occur in an embodiment.

FIGS. 14 to 17 represent still another embodiment for solving a limitation that may occur in an embodiment.

FIGS. 18 to 23 represent still another embodiment for solving a limitation that may occur in an embodiment.

FIG. 25 represents a resource for diagnostic information on the broadcast reception device according to an embodiment.

FIG. 27 represents the syntax of a diagnostic information request object according to the embodiment of FIG. 26.

FIG. 29 represents the syntax of a diagnostic information request reply object according to the embodiment of FIG. 28.

FIG. 30 represents a resource including an object for diagnostic information on the broadcast reception device according to an embodiment.

DETAILED DESCRIPTION OF THE EMBODIMENTS

Exemplary embodiments are particularly described and examples are represented in the accompanying drawings. The following detailed description provided with reference to the accompanying drawings is to describe exemplary embodiments rather than to represent only embodiments that may be implemented according to embodiments. The following detailed description includes details in order to provide thorough understanding of the present disclosure. However, it is obvious to a person skilled in the art that the present disclosure may be implanted without these details.

Although most of the terms used herein are selected among general terms widely used in a corresponding field, some terms are arbitrarily selected by the applicant and their meanings are described in detail in the following description as necessary. Thus, the present disclosure should be understood based on the intended meaning of a term, not on the meaning of the simple name or meaning of the term.

Figure 1:
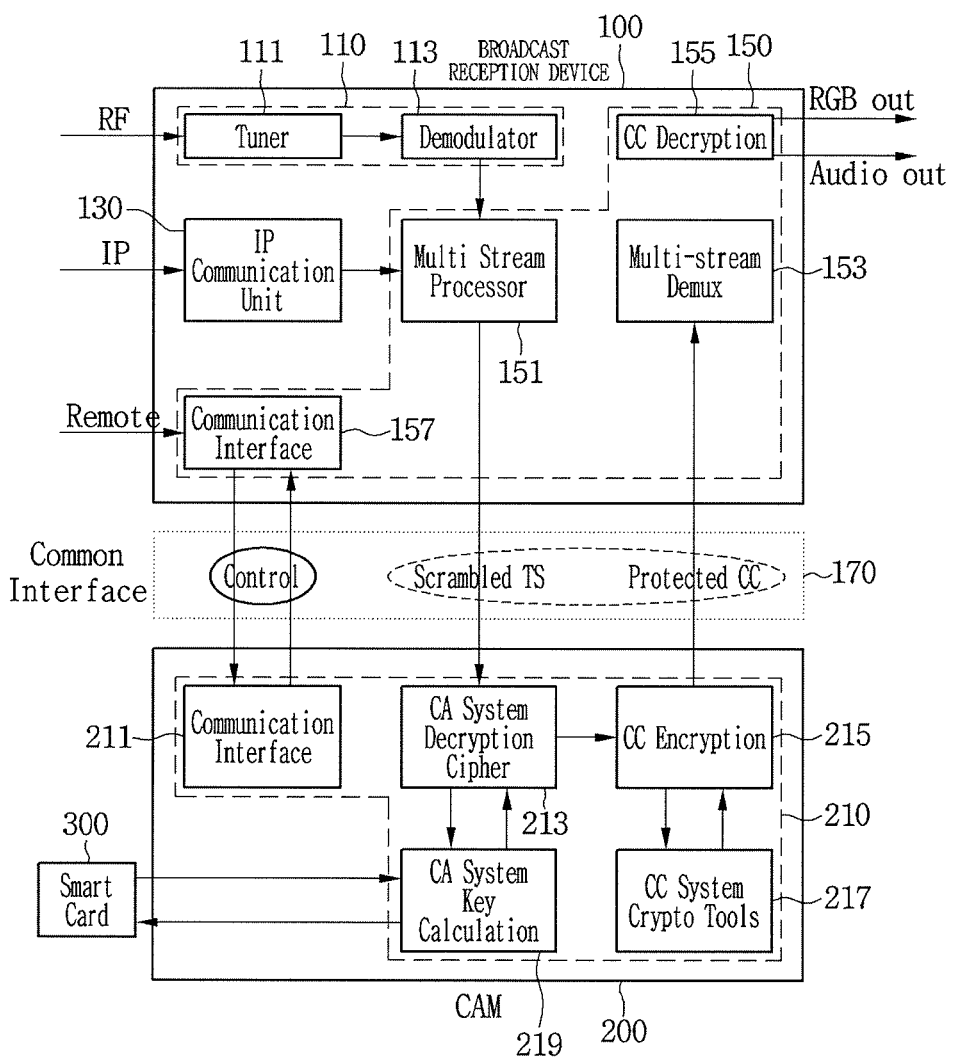
FIG. 1 represents the structures of a broadcast reception device and a conditional access module (CAM) according to an embodiment.

FIG. 1 represents the structures of a broadcast reception device and a conditional access module (CAM) according to an embodiment.

A broadcast reception device 100 according to the embodiment includes a broadcast reception unit 110, an internet protocol (IP) communication unit 130, a control unit 150, a common interface (CI) slot 170, and an output unit (not shown).

The broadcast reception unit 110 receives and demodulates a broadcast signal. In particular, the broadcast reception unit 110 may include a tuner 111 receiving the broadcast signal. Also, the broadcast reception unit 110 may include a demodulator 113 demodulating the broadcast signal.

The IP communication unit 130 receives and transmits IP data.

The control unit 150 controls the operation of the broadcast reception device 100. In particular, the control unit 150 may include a multi-stream processor 151 that controls a multi-stream input to the CAM. Also, the control unit 150 may include a multi-stream demux 153 that de-multiplexes each stream from multiple streams that have been descrambled. Also, the control unit 150 may include a contents control (CC) decryption unit 155 that decrypts broadcast content encrypted for content protection. The CC decryption unit 155 may decrypt the encrypted broadcast content based on a unique key value allocated to the broadcast reception device 100. Also, the control unit 150 may include a communication interface unit 157 that transmits the control command of the broadcast reception device 100 to the CAM and receives a reply to the control command from the CAM.

The CI slot 170 connects the broadcast reception device 100 and the CAM 200. In particular, the broadcast reception device 100 may transmit a control command and a scrambled broadcast stream through the CI slot and receive a reply to the control command and a broadcast stream obtained by encrypting the descrambled broadcast stream. In an embodiment, the CI slot 170 may be any one of standard PC memory card international association (PCMCIA) and universal serial bus (USB).

The CAM 200 according to an embodiment includes a control unit (i.e., controller) 210. In particular, the control unit 210 controls the operation of the CAM 200. In particular, the control unit 210 receives a scrambled broadcast stream from the broadcast reception device 100 and descrambles the received stream. In particular, the control unit 210 may include a communication interface 211 that receives a control command from the broadcast reception device 100 and transmits a reply to the control command. The communication interface 211 of the CAM 200 may interact through a common interface (CI) with the communication interface 157 of the broadcast reception device 100. In this case, the CI may be a communication protocol between the broadcast reception device 100 and the CAM 200. In a particular embodiment, the broadcast reception device 100 and the CAM 200 may control the interaction of an application in operation through the communication interfaces 157 and 211.

Also, the control unit 210 may include a CAS key calculation unit 219 that obtains a control word (CW) based on a broadcast stream. In this case, the CW represents a key needed for descrambling scrambled broadcast content. In particular, the CAS key calculation unit 219 may extract an entitlement control message (ECM) from a broadcast stream to transmit it to a smart card 300, and obtain a CW from the smart card 300.

Also, the control unit 210 may include a CAS decryption cipher 213 that descrambles scrambled broadcast content by using the obtained CW. Also, the control unit 210 may include a CC encryption unit 215 and CC system crypto tools 217 used to encrypt descrambled broadcast content in order to prevent the descrambled broadcast content from becoming leaked. In a particular embodiment, the CC encryption unit 215 may obtain a key value for encryption from the CAS decryption cipher 213 to encrypt descrambled broadcast content. In this case, the key value for encryption may be a unique key value allocated to a corresponding CAM.

The CAM 300 may extract usage rule information (URI) from a broadcast stream. The URI is a content usage rule designated by at least any one of a content provider and a content distributor. In particular, the URI may represent at least one of content output and copy rules. For example, the URI may represent whether to permit the copying of content. The URI may represent the usage rule of a specific broadcast service. Also, the URI may represent the usage rule of a specific event that a broadcast service includes. Also, the URI may represent whether to permit the analog output of content. In this case, the analog output is outputting analog audio or analog video. Also, the digital output is outputting digital audio or digital video. In particular, a terminal providing the analog output may include at least one of a scart terminal, a composite terminal, and a component terminal. A terminal providing the digital output may include at least one of a high definition multimedia interface (HDMI) terminal and a Sony Philips digital interface (SP-DIF) terminal.

Figure 2:
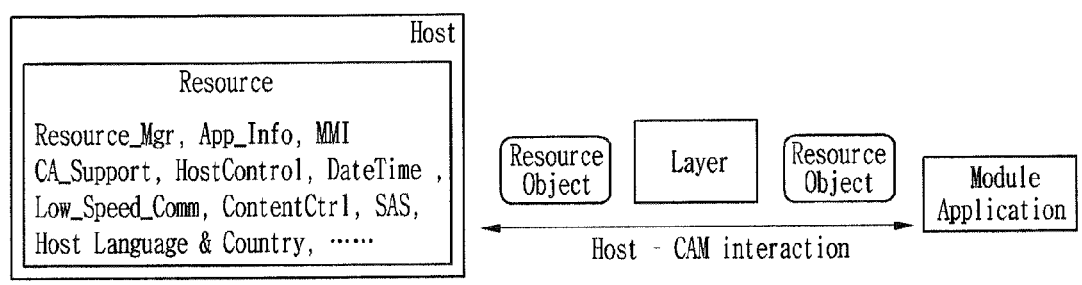

FIGS. 2 to 3 are diagrams for schematically explaining a resource that a CAM and a broadcast reception device according to an embodiment transmit and receive.

In an embodiment, the CAM 200 and the broadcast reception device 100 may transmit and receive resources through interaction. In this case, the resource may be a data unit for transmitting/receiving data on a specific function between the CAM 200 and the broadcast reception device 100. The resource may be divided according to a function. Also, the resource may include an object for transmitting/receiving data on a sub function of a function. In this case, the object is a subordinate concept of the resource and may be a data unit for identifying the sub function of the specific function. In addition, the resource may be defined according to a communication protocol between the broadcast reception device 100 and the CAM 200.

The communication protocol between the broadcast reception device 100 and the CAM 200 may include a plurality of protocol layers. In particular, the plurality of protocol layers may include a physical layer, a link layer, and an application layer. In this case, the resource may be included in the application layer, the top layer of the protocol layer.

The application layer may include a plurality of resources. Particular examples of the plurality of resources are shown in FIG. 3. A man machine interface (MMI) of the plurality of resources in FIG. 3 may provide interaction including an output unit and an input unit.

In a particular embodiment, the MMI may have a plurality of embodiments according to the processing method of the broadcast reception device 100. In a first embodiment, the CAM 200 may directly control the display method of the MMI for interaction with a user. In particular, a related application installed in the CAM 200 may directly control the displaying of the MMI. The MMI method according to the first embodiment may be referred to as a low-level MMI.

In a second embodiment, the display related application of the broadcast reception device 100 may control the display method of the MMI. In particular, the broadcast reception device 100 may control the MMI in the same way as the display related application installed in the broadcast reception device 100. The MMI method according to the second embodiment may be referred to as an application MMI.

In a third embodiment, the broadcast reception device 100 may control the display method of the MMI. In particular, the broadcast reception device 100 may determine the display method of an object received from the CAM 200. The MMI method according to the three embodiment may be referred to as a high-level MMI.

FIG. 4 represents an object according to a high-level MMI.

As shown in FIG. 4, the object according to the high-level MMI may include an object for MMI close. In a particular embodiment, the object for the MMI close may be an object for closing the currently displayed MMI. In this case, the object for MMI close may be an object that is transmitted by the broadcast reception device 100 to the CAM 200. In this case, the closed MMI may be an interface displayed through the CAM 200.

Also, the object according to the high-level MMI may include an object for graphic and display information request. In a particular embodiment, the object for the graphic and display information request may be an object for requesting graphic and display information from the broadcast reception device 100 by the CAM 200.

Also, the object according to the high-level MMI may include an object for a reply to a request from the CAM 200. In a particular embodiment, the object for the reply may be an object for a reply to the graphic and display information request of the CAM 200.

Also, the object according to the high-level MMI may include an object for user's input reception. In a particular embodiment, an object for a user input may be an object that the CAM 200 transmits to the broadcast reception device 100 in order to receive an input.

Also, the object according to the high-level MMI may include an object for a reply to an input reception request from the CAM 200. In a particular embodiment, the object for the reply may be an object for a reply to the input reception request that the broadcast reception device 100 has received from the CAM 200.

Also, the object according to the high-level MMI may be an object for showing a plurality of selective items to a user. In particular, it may be an object that the CAM 200 transmits to the broadcast reception device 100.

Also, the object according to the high-level MMI may be an object for transmitting, to the CAM 200, a user input to the plurality of selective items.

Also, the object according to the high-level MMI may be an object for showing, a plurality of items that may not be selected (hereinafter, referred to as "fixed items"), to a user.

Figure 5:
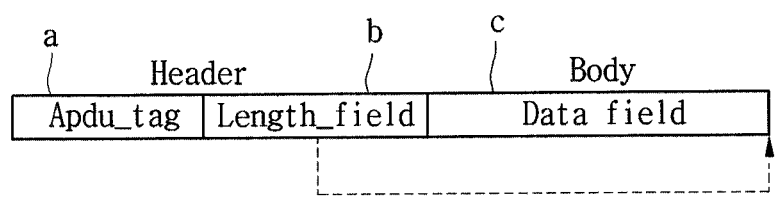
FIG. 5 represents a data unit for object transmission according to an embodiment.

FIG. 5 represents a data unit for object transmission according to an embodiment.

The object may be transmitted in the form of a data unit. In this case, the data unit may be a transmission unit that is defined according to a communication protocol between the CAM 200 and the broadcast reception device 100. The data unit for the object transmission may be referred to as an application protocol data unit (APDU). The data unit for the object transmission may include a header and a body.

The header of the data unit may include tag information for identifying an object that the data unit transmits. The tag information for identifying the object may be Apdu_tag field a. Also, the header of the data unit may include length information on information that the data unit transmits. The length information may be Length_field b.

The body of the data unit may include data field c☐. The data field may include data for implementing an object that an object represents. For example, object data may be related to the displaying of the MMI. Due to a buffer size restriction, the object transmitted through the data unit may be divided into a plurality of data units and transmitted. In this case, the tag field of the data unit may include another tag value according to included object data in an embodiment. For example, the tag field of the data unit that includes the last of object data obtained through division may include L_apdu_tag. In addition, the tag field of the data unit that includes remaining object data may include M_apdu_tag.

Figure 6:
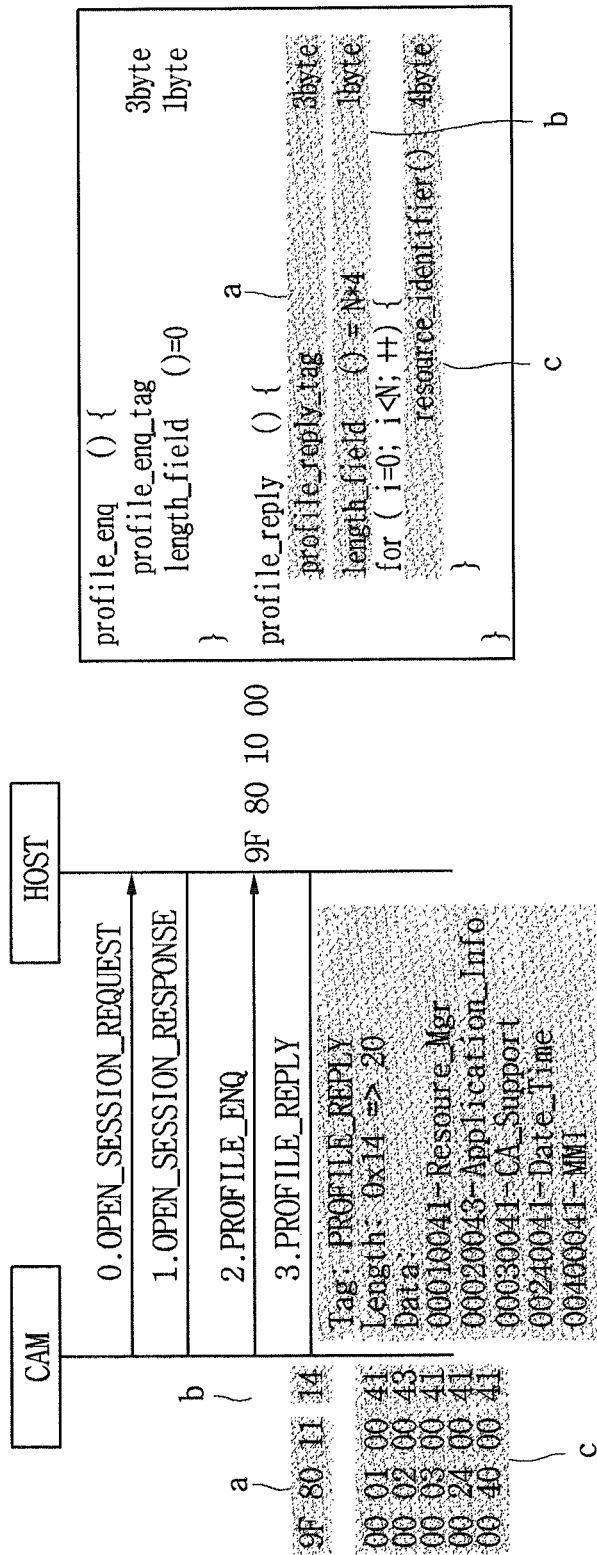
FIG. 6 represents an example of an object interaction between the broadcast reception device and the CAM according to an embodiment.

FIG. 6 represents an example of an object interaction between the broadcast reception device 100 and the CAM 200 according to an embodiment.

The CAM 200 initially transmits a request for session open to the broadcast reception device 100. In this case, the session may indicate a logical link for activating the connection between the CAM 200 and the broadcast reception device to transmit and receive data. When the broadcast reception device 100 receives the request form the session open, it transmits a response to the request to the CAM. When the session is linked, the CAM 200 transmits, to the broadcast reception device 100, a request for receiving a profile input from a user. In this case, the broadcasting reception device 100 may identify the request from the CAM 200 based on tag information. The broadcast reception device 100 transmits a reply to the request from the CAM 200. Since the request from the CAM 200 is related to the profile input, the broadcast reception device 100 may transmit, to the CAM 200, the reply to the request for the profile input. In this case, the data unit that the CAM 200 receives may include matters as shown in FIG. 6. In particular, the data unit may include tag information ①, length information ②☐ and data information ③.

Figure 7:
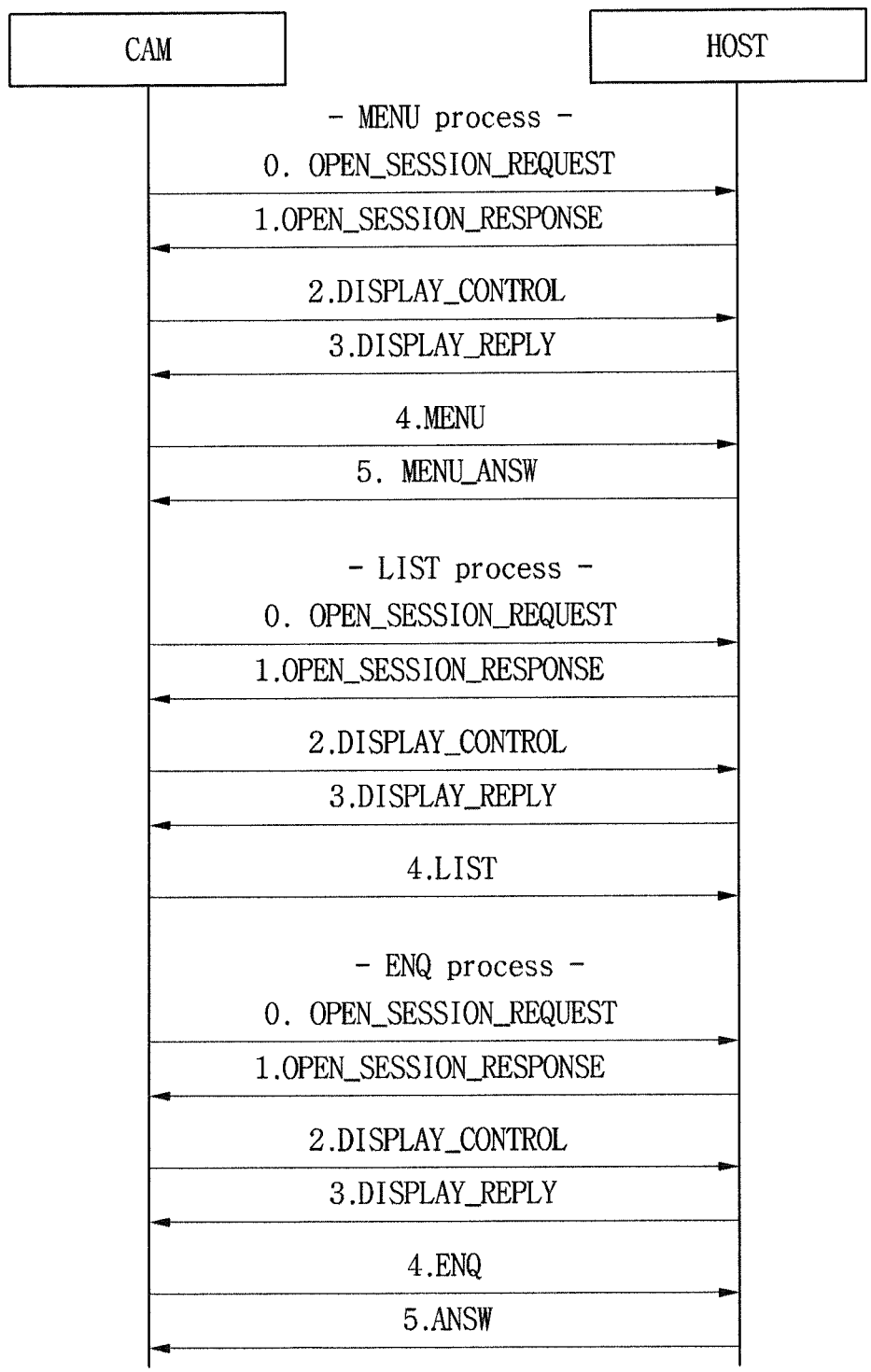
FIG. 7 represents an operating method according to an embodiment.

FIG. 7 represents an operating method according to an embodiment.

As shown in FIG. 7, the broadcast reception device 100 and the CAM 200 interacts by typically using a high-level MMI resource. In a particular embodiment, the broadcasting reception device 100 and the CAM 200 may transmit/receive a resource for a user input request and a resource for a reply to an input request.

A first one of embodiments in FIG. 7 may be related to a process of enumerating a plurality of selective items and receiving an input to the listed items. A menu for the first embodiment may be referred to as a process. In addition, an interface on which the plurality of selective items are shown may be referred to as a menu.

A second embodiment may be related to a process of enumerating a plurality of fixed items and receiving an input to the listed items. A list for the second embodiment may be referred to as a process. In addition, an interface on which the plurality of fixed items is shown may be referred to as a list.

A third embodiment may be related to a process for receiving a user input. The third embodiment may be referred to as a process for ENQ.

However, in the high-level MMI process of an embodiment, there is a limitation in that it is difficult for the CAM 200 to check the processing status of the high-level MMI of the broadcast reception device 100. In particular, in the case of the high-level MMI, the broadcast reception device determines the display method of an object received from the CAM 200. As a result, there is a case where there is a difference between an interface that the broadcast reception device 100 displays and an object that the CAM 200 transmits for display.

FIGS. 8 to 13 represent still another embodiment for solving a limitation that may occur in an embodiment. In particular, FIGS. 8 to 13 relates to the first of embodiments in FIG. 7.

Figure 8:
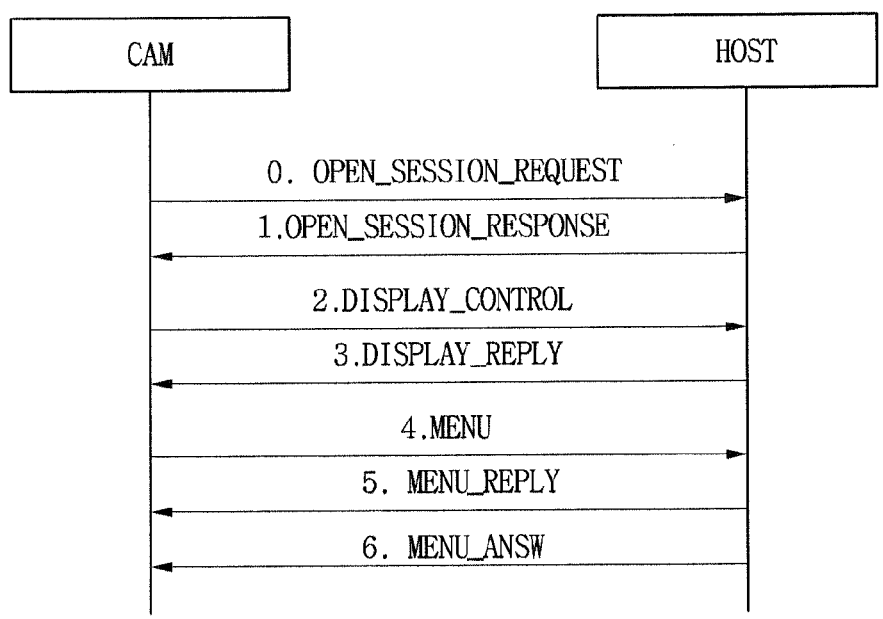

As shown in FIG. 8, an object transmission/reception process according to an embodiment may include a process of transmitting, by the broadcast reception device 100, information on the processing status of an object for showing the plurality of selective items to the CAM 200. In other words, a high-level MMI resource according to an embodiment may include an object for the information on the processing status of the object for showing the plurality of selective items. In this case, the object for showing the plurality of selective items may be a menu object. In addition, the object for the processing status information on the menu object may be referred to as a menu reply object.

Figure 9:

FIG. 9 represents the syntax of a menu reply object according to the embodiment of FIG. 8. As shown in FIG. 9, the menu reply object may include tag information. In particular, the menu reply object may include tag information that enables the CAM 200 to identify a data unit including the menu reply object. In this case, the tag information may be a menu_reply_tag field. In a particular embodiment, the menu-reply_tag field may be 24 bits. Also, the menu reply object may include length information. In particular, the menu reply object may include total length information on the data field of a data unit including the menu reply object. In this case, the length information may be a length_field.

Also, the menu reply object may include operation status information on the menu object. In particular, the menu reply object may include information on the processing status of the menu object that the CAM 200 has requested. In this case, the operation status information on the menu object may be a menu_status field.

For example, when the menu_status field has a value of 01, it may represent that the broadcast reception device 100 has succeeded in processing the menu object. For another example, when the menu_status field has a value of 02, it may represent that the broadcast reception device 100 is processing the menu object. For another example, when the menu_status field has a value of 03, it may represent that the broadcast reception device 100 has failed to process the menu object.

Also, the menu object may include page information on the MMI. In this case, a page may be a unit for identifying a plurality of MMIs. In particular, the menu object may include page number information on a high-level MMI that is requesting/replying between the broadcast reception device 100 and the CAM 200. In this case, the page number information on the high-level MMI may be a page_number field. The broadcast reception device 100 and the CAM 200 may identify the page of the MMI displayed through the page_number field.

Figure 10:
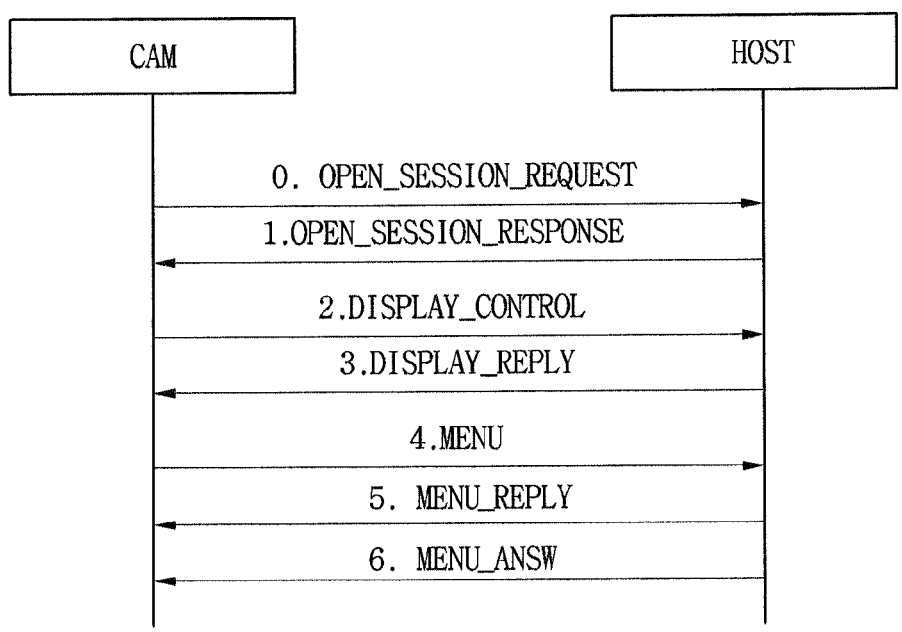

As shown in FIG. 10, the object transmission/reception process according to the embodiment may include a process of transmitting, by the CAM 200, page information needing to be processed by the broadcast reception device, to the broadcast reception device 100. In particular, the menu object of the MMI according to the embodiment may include interface page information that needs to be processed.

FIG. 11 represents the syntax of the menu object according to the embodiment of FIG. 10. As shown in FIG. 11, the menu object may include page number information. In particular, the menu object may include page number information on a high-level MMI that is requesting/replying between the broadcast reception device 100 and the CAM 200. In this case, the page information in the menu object may be to represent an interface attempting to check a processing status among a plurality of MMIs displayed on the broadcast reception device 100. In this case, page information on the interface may be a page_number field. In a particular embodiment, the page_number field may be 8 bits.

Also, the menu object may include timeout information on the MMI. In particular, the timeout information may be information on the time at which the broadcast reception device 100 ends the high-level MMI, when the broadcast reception device 100 fails to receive a control command fro the CAM 200. The broadcast reception device 100 may close the high-level MMI when a time designated based on the timeout information elapses. The timeout information may be a timeout field. In a particular embodiment, the timeout field may be 24 bits.

Figure 12:
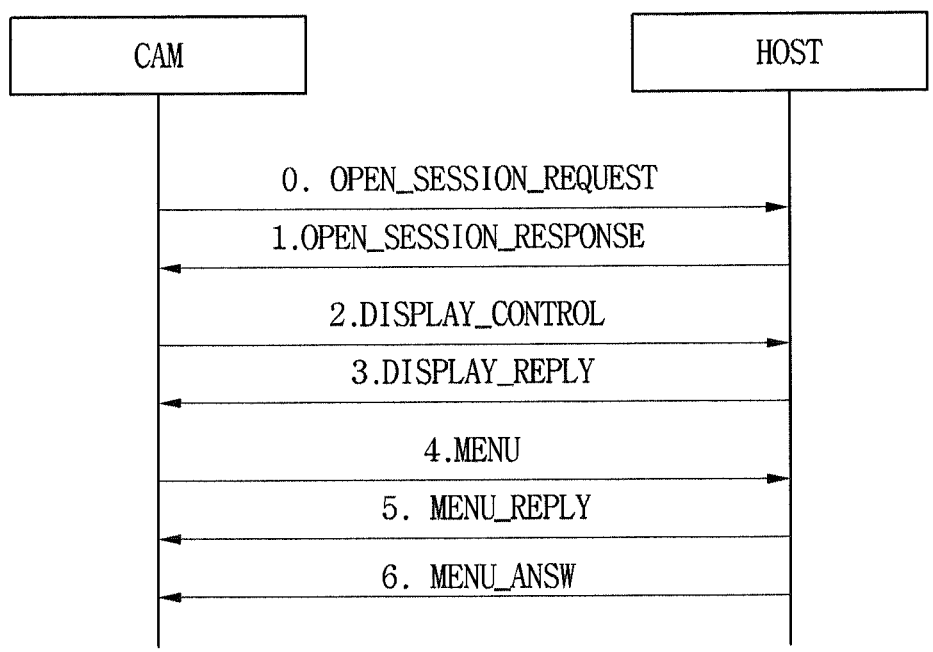

As shown in FIG. 12, an object transmission/reception process according to an embodiment may include a process of transmitting, to the CAM 200, MMI page number information that the broadcast reception device 100 is processing or has succeeded in processing. In particular, the MMI according to the embodiment may include an object for transmitting MMI page information that the broadcast reception device 100 is processing or has succeeded in processing. In this case, the object including the MMI page information that the broadcast reception device 100 is processing or has succeeded in processing may be a menu answer Menu_Answ object. The broadcast reception device 100 may receive interface page information needing to be processed and transmit the menu answer object in reply thereto.

FIG. 13 represents the syntax of the menu answer object according to the embodiment of FIG. 12. As shown in FIG. 13, the menu answer object may include page number information. In particular, the menu answer object may include page number information on the high level-MMI that the broadcast reception device 100 is processing or has succeeded in processing. In this case, page information on the interface may be a page_number field. In a particular embodiment, the page_number field may be 8 bits.

FIGS. 14 to 17 represent still another embodiment for solving a limitation that may occur in an embodiment. In particular, FIGS. 14 to 17 relate to the second of embodiments in FIG. 7.

Figure 14:
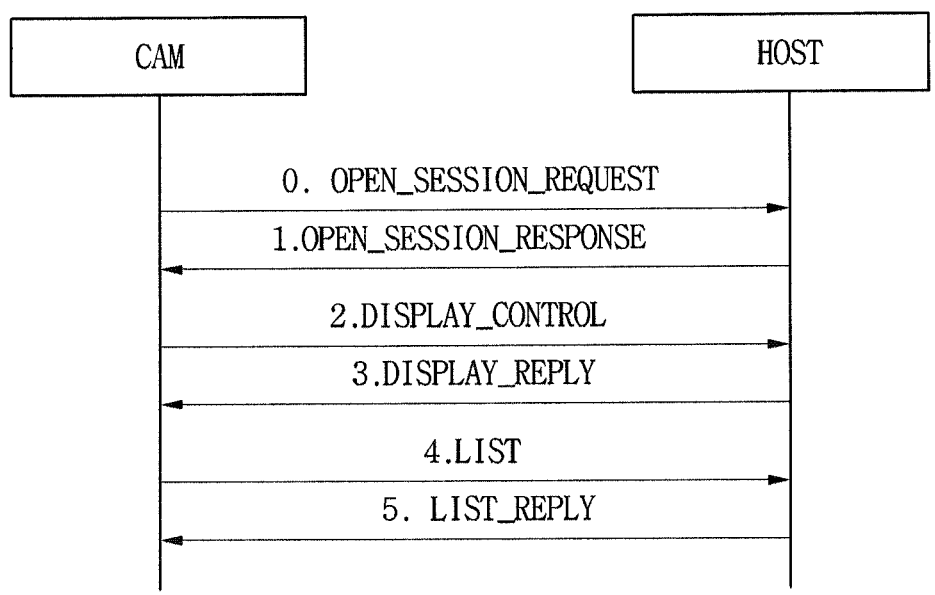

As shown in FIG. 14, an object transmission/reception process according to an embodiment may include a process of transmitting, by the broadcast reception device 100, information on the processing status of an object for a plurality of fixed items, to the CAM 200. In particular, a high-level MMI according to an embodiment may include information on the processing status of an object for the plurality of fixed items. An object for showing the plurality of fixed items may be referred to as a list object. Also, information representing the processing status of the list object may be referred to as a list reply List_reply object.

FIG. 15 represents the syntax of a list reply object according to the embodiment of FIG. 14. As shown in FIG. 15, the list reply object may include tag information. In particular, the list reply object may include tag information that enables the CAM 200 to identify a data unit including the list reply object. In this case, the tag information may be a list_reply_tag field. In a particular embodiment, the list_reply_tag field may be 24 bits.

Also, the list replay object may include length information. In particular, the list reply object may include total length information on the data field of a data unit including the list reply object. In this case, the length information may be a length_field.

Also, the list reply object may include operation status information on the list object. In particular, the list reply object may include information on the processing status of the list object that the CAM 200 has requested. In this case, the operation status information on the list object may be a list_status field.

For example, when the list_status field has a value of 01, it may represent that the broadcast reception device 100 has succeeded in processing the list object. For another example, when the list_status field has a value of 02, it may represent that the broadcast reception device 100 is processing the list object. For another example, when the list_status field has a value of 03, it may represent that the broadcast reception device 100 has failed to process the list object.

Also, the list object may include page information on the MMI. In particular, the list object may include page number information on a high-level MMI that is requesting/replying between the broadcast reception device 100 and the CAM 200. In this case, the page number information on the high-level MMI may be a page_number field. The broadcast reception device 100 and the CAM 200 may identify the page of the MMI displayed through the page_number field.

Figure 16:
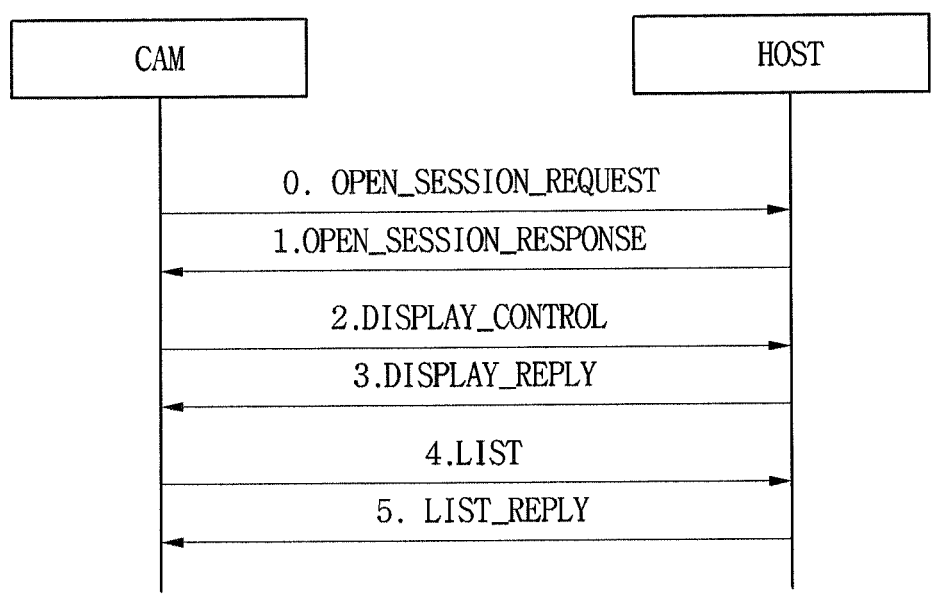

As shown in FIG. 16, the object transmission/reception process according to the embodiment may include a process of transmitting, by the CAM 200, page information needing to be processed by the broadcast reception device 100, to the broadcast reception device 100. In particular, the list object of the MMI according to the embodiment may include interface page information that needs to be processed. In this case, a page may be a unit for identifying a plurality of MMIs.

FIG. 17 represents the syntax of the list object according to the embodiment of FIG. 16. As shown in FIG. 17, the list object may include page number information. In particular, the list object may include page number information on a high-level MMI that is requesting/replying between the broadcast reception device 100 and the CAM 200. In this case, the page information in the list object may be to represent an interface attempting to check a processing status among a plurality of MMIs displayed on the broadcast reception device 100. In this case, page information on the interface may be a page_number field. In a particular embodiment, the page_number field may be 8 bits.

Also, the list object may include timeout information on the MMI. In particular, the timeout information may be information on the time at which the broadcast reception device 100 ends the MMI, when the broadcast reception device 100 fails to receive a control command from the CAM 200. The broadcast reception device 100 may end the MMI when a time designated based on the timeout information elapses. The timeout information may be a timeout field. In a particular embodiment, the timeout field may be 24 bits.

FIGS. 18 to 23 represent still another embodiment for solving a limitation that may occur in an embodiment. In particular, FIGS. 18 to 23 relate to the third one of embodiments in FIG. 7.

Figure 18:
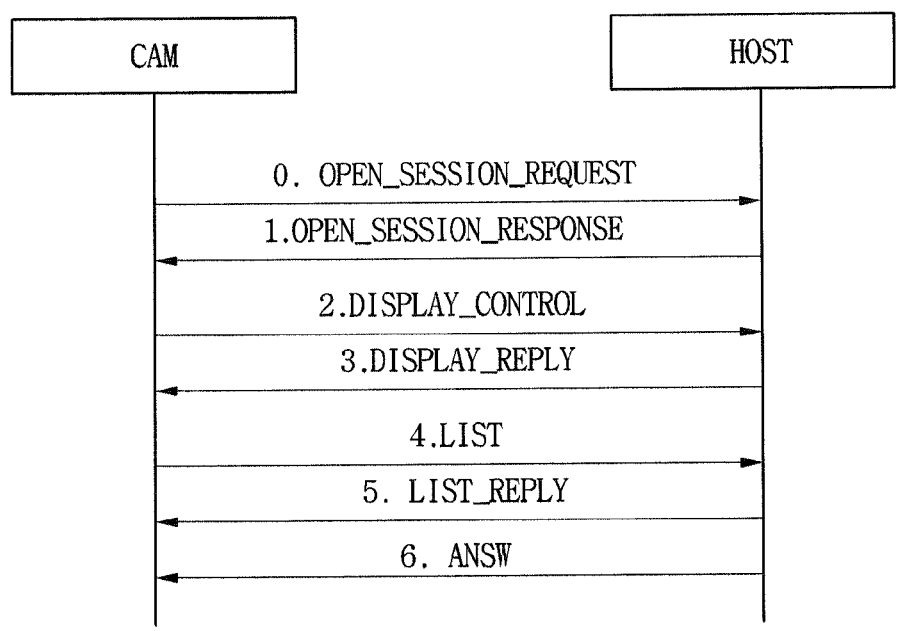

As shown in FIG. 18, an object transmission/reception process according to an embodiment may include a process of transmitting, by the broadcast reception device 100, information on the processing status of an object for a user input request, to the CAM 200. In particular, a MMI according to an embodiment may include information on the processing status of an object for the user input request. In this case, the object for the user input request may be referred to as an ENQ object. In addition, information representing the processing status of the ENQ object may be referred to as an ENQ reply ENQ_reply object.

FIG. 19 represents the syntax of an ENQ reply object according to the embodiment of FIG. 18. As shown in FIG. 19, the ENQ reply object may include tag information. In particular, the ENQ reply object may include tag information that enables the CAM 200 to identify a data unit including the ENQ reply object. In this case, the tag information may be an enq_reply_tag field. In a particular embodiment, the enq_reply_tag field may be 24 bits.

Also, the ENQ reply object may include length information. In particular, the ENQ reply object may include total length information on the data field of a data unit including the ENQ reply object. In this case, the length information may be a length_field.

Also, the ENQ reply object may include operation status information on the ENQ object. In particular, the ENQ reply object may include information on the processing status of the ENQ object that the CAM 200 has requested. In this case, the operation status information on the ENQ object may be a enq_status field. In a particular embodiment, the operation status information on the ENQ object may represent that the broadcast reception device 100 has succeeded in processing the ENQ object. In another embodiment, the operation status information on the ENQ object may represent that the broadcast reception device 100 is processing the ENQ object. In another embodiment, the operation status information on the ENQ object may represent that the broadcast reception device 100 has failed to process the ENQ object.

For example, when the enq_status field has a value of 01, it may represent that the broadcast reception device 100 has succeeded in processing the ENQ object. For another example, when the enq_status field has a value of 02, it may represent that the broadcast reception device 100 is processing the ENQ object. For another example, when the enq_status field has a value of 03, it may represent that the broadcast reception device 100 has failed to process the ENQ object.

Also, the ENQ object may include page information on the MMI. In particular, the ENQ object may include page number information on a high-level MMI that is requesting/replying between the broadcast reception device 100 and the CAM 200. In this case, the page number information on the high-level MMI may be a page_number field. The broadcast reception device 100 and the CAM 200 may identify the page of the MMI displayed through the page_number field.

Figure 20:
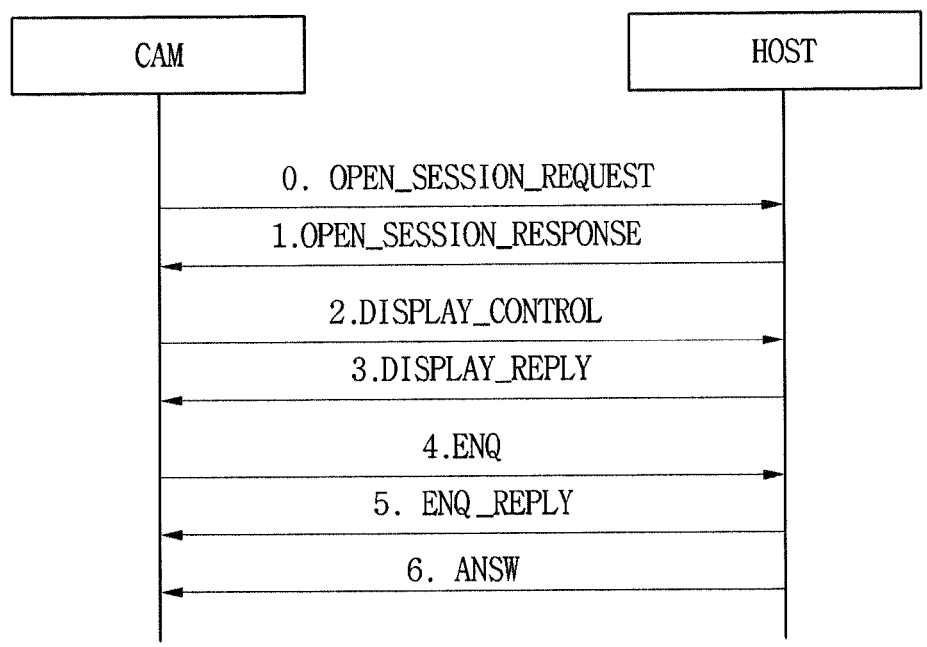

As shown in FIG. 20, the object transmission/reception process according to the embodiment may include a process of transmitting, by the CAM 200, page information needing to be processed by the broadcast reception device 100, to the broadcast reception device 100. In particular, the ENQ object of the MMI according to the embodiment may include interface page information that needs to be processed. In this case, a page may be a unit for identifying a plurality of MMIs.

FIG. 21 represents the syntax of the ENQ object according to the embodiment of FIG. 20. As shown in FIG. 21, the ENQ object may include page number information. In particular, the ENQ object may include page number information on a high-level MMI that is requesting/replying between the broadcast reception device 100 and the CAM 200. In this case, the page number information in the ENQ object may be to represent an interface attempting to check a processing status among a plurality of MMIs displayed on the broadcast reception device 100. In this case, page information on the interface may be a page_number field. In a particular embodiment, the page_number field may be 8 bits.

Also, the ENQ object may include timeout information on the MMI. In particular, the timeout information may be information on the time at which the broadcast reception device 100 ends the MMI, when the broadcast reception device 100 fails to receive a control command from the CAM 200. The broadcast reception device 100 may end the MMI when a time designated based on the timeout information elapses. The timeout information may be a timeout field. In a particular embodiment, the timeout field may be 24 bits.

Figure 22:
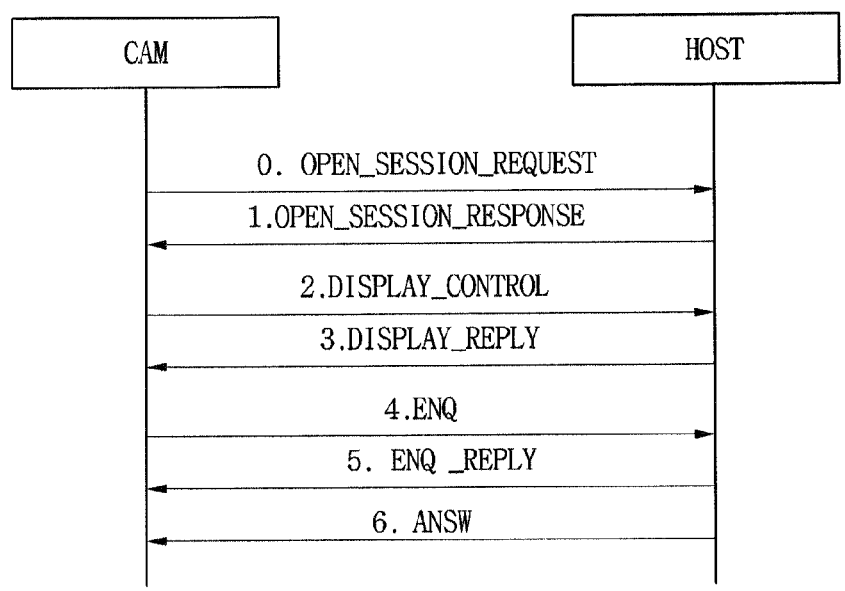

As shown in FIG. 22, an object transmission/reception process according to an embodiment may include a process of transmitting, to the CAM 200, MMI page number information that the broadcast reception device 100 is processing or has succeeded in processing. In particular, the MMI according to the embodiment may include an object for transmitting MMI page information that the broadcast reception device 100 is processing or has succeeded in processing. In this case, the object including the MMI page information that the broadcast reception device 100 is processing or has succeeded in processing may be an answer Answ object. The broadcast reception device 100 may receive interface page information needing to be processed from the CAM 200 and transmit the answer object in response thereto.

FIG. 23 represents the syntax of the answer object according to the embodiment of FIG. 22. As shown in FIG. 23, the answer object may include page number information. In particular, the answer object may include page number information on a high level-MMI that the broadcast reception device 100 is processing or has succeeded in processing. In this case, page information on the interface may be a page_number field. In a particular embodiment, the page_number field may be 8 bits.

Figure 24:
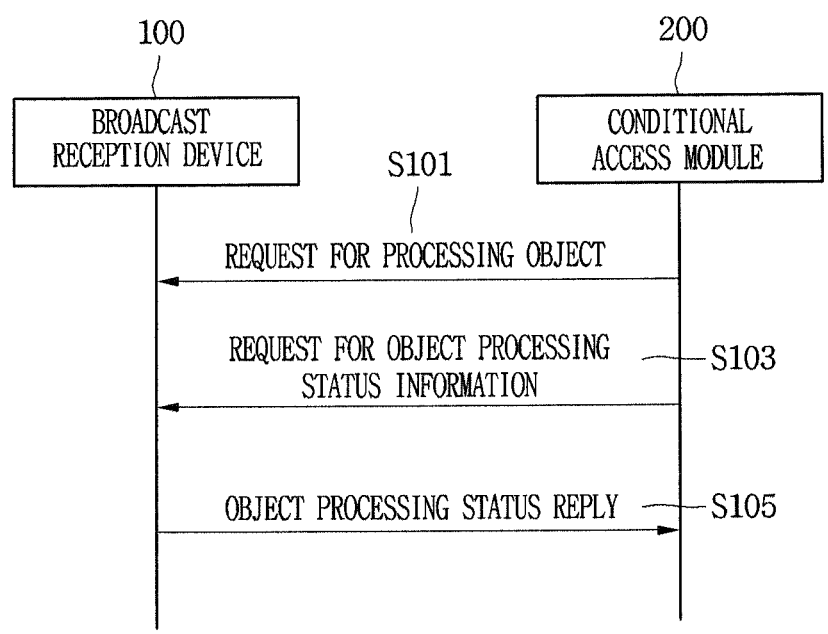
FIG. 24 is an operation flowchart of the broadcast reception device and the CAM according to an embodiment.

FIG. 24 is an operation flowchart of the broadcast reception device and the CAM according to an embodiment.

The CAM 200 requests the broadcast reception device 100 to process an object in step S101. In other words, the CAM 200 may request the broadcast reception device 100 to process a function capable of being expressed through an object. In a particular embodiment, the CAM 200 may request the processing of an object for a MMI.

In an embodiment, the CAM 200 may show a plurality of selective items and request the broadcast reception device 100 to process an object for receiving a user input to the shown items. In this case, the object requested by the CAM 200 may be referred to as a menu object.

In another embodiment, the CAM 200 may show a plurality of fixed items and request the broadcast reception device 100 to process an object for receiving an input to the shown items. In this case, the object requested by the CAM 200 may be referred to as a list object.

In another embodiment, the CAM 200 may request the broadcast reception device 100 to process an object for receiving a user input. In this case, the object requested by the CAM 200 may be referred to as an answer object.

The CAM 200 requests processing status information on the requested object, requesting the processing of the object in step S103. In particular, it is typically difficult to know the processing status of the object requested to be processed, by the CAM 200. Thus, since there is a limitation in that there is a case where there is a mismatch between the operations of the broadcast reception device 100 and the CAM 200, the CAM 200 according to an embodiment requests processing status information on an object along with an object processing request. In this case, the CAM 200 may request processing status information on a function requested to be processed, through a data unit. Thus, the data unit transmitted by the CAM 200 may include data for requesting information on the processing status of the function requested to be processed.

In this case, the CAM 200 may transmit, to the broadcast reception device 100, a status processed by the broadcast reception device 100 together with information on a page attempting to clearly know. In particular, the CAM 200 may transmit page information on a MMI attempting to know a processing status. A page may be a unit for identifying a plurality of MMIs. The plurality of MMIs may be indexed through numbering.

Also, the CAM 200 may transmit timeout information on an object requested to be processed to the broadcast reception device 100. In particular, the timeout information may be information on the time at which the broadcast reception device 100 ends an object being processed without the control command of the CAM 200. The broadcast reception device 100 may end an object being processed based on the received timeout information.

The CAM 200 receives a reply to a request from the broadcast reception device 100 in step S105. In an embodiment, the CAM 200 may receive processing status information on the object requested to be processed, from the broadcast reception device 100. The broadcast reception device 100 may transmit the processing status information requested by the CAM 200 through a data unit. The data unit may include processing status information on a function requested to be processed, by the CAM 200.

In a particular embodiment, the processing status information transmitted by the broadcast reception device 100 may represent that the broadcast reception device has succeeded in processing the function requested to be processed by the CAM 200. In another embodiment, the processing status information transmitted by the broadcast reception device 100 may represent that the broadcast reception device is processing the function requested to be requested, by the CAM 200. In another embodiment, the processing status information transmitted by the broadcast reception device 100 may represent that the broadcast reception device has failed to process the function requested to be processed, by the CAM 200.

In particular, the processing status information on the object may be processing status information on a menu object. Also, the processing status information on the object may be processing status information on a list object. Also, the processing status information on the object may be processing status information on an answer object.

In another embodiment, the CAM 200 may receive status information on a page of an MMI requested to be processed, from the broadcast reception device 100.

According to embodiments as described above, even under the situation that the broadcast reception device 100 controls the display method of an interface, the CAM 200 may obtain object processing status information from the broadcast reception device 100 to prevent a mismatch between devices.

FIG. 25 represents a resource for diagnostic information on the broadcast reception device according to an embodiment. The diagnostic information may be information for representing the status of the broadcast reception device. The diagnostic information may be information that a viewer may usefully use, when attempting to troubleshoot a problem that may occur during the viewing of controlled content. In this example, the controlled content is scrambled broadcast content and refers to content needing to descramble through the CAM.

The resource that is a data unit for interaction between the broadcast reception device 100 and the CAM 200 may include a resource for diagnosing the status of the broadcast reception device 100 and showing a diagnostic result. In this case, the resource for requesting the status diagnosis of the broadcast reception device 100 and showing the diagnostic result may be a diagnostic information resource. In a particular embodiment, the resource for the diagnostic information on the broadcast reception device 100 may include an object for a diagnostic information request and an object for a reply to the diagnostic information request. Resource allocation values in FIG. 25 are only examples and other values may be allocated when being actually used.

Figure 26:
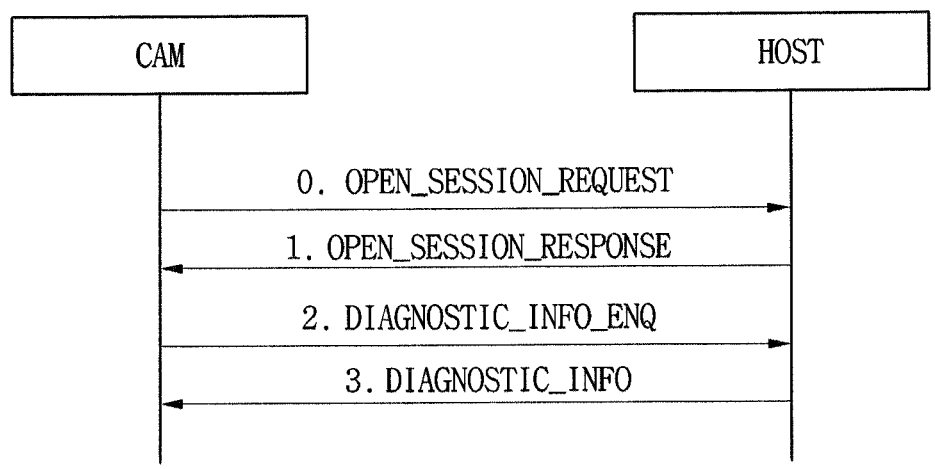
FIG. 26 represents an object interaction between the broadcast reception device and the CAM according to an embodiment.

FIG. 26 represents object interaction between the broadcast reception device and the CAM according to an embodiment.

As described in FIG. 25, the resource for the diagnostic information may be defined in order to request/reply the diagnostic information on the broadcast reception device 100, and the resource for the diagnostic information may include a diagnostic information request object and a diagnostic information request reply object.

When a session between the broadcast reception device 100 and the CAM 200 is linked, the CAM 200 may transmit the diagnostic information request object to the broadcast reception device 100. In this case, the diagnostic information request object transmitted by the CAM 200 may be a DIAGNOSTIC_INFO_ENQ object.

FIG. 27 represents the syntax of the diagnostic information request object according to the embodiment of FIG. 26.

As shown in FIG. 27, the diagnostic information request object may include tag information for representing that a data unit includes the diagnostic information request object. In particular, the broadcast reception device 100 may identify, through the tag information, an object that the data unit includes. The tag information may have a different value for each object unit. The tag information representing that the data unit includes the diagnostic information request object may be a diagnostic_info_enq_tag field. In a particular embodiment, the diagnostic_info_enq_tag field may be 24 bits.

Also, the diagnostic information request object may include total length information on a data field in the data unit. The total length information on the data field may be a length_field. In the present embodiment, since the data unit of the diagnostic information request object needs no information except for tag information included in a header, the length information may have a value of 0.

Figure 28:
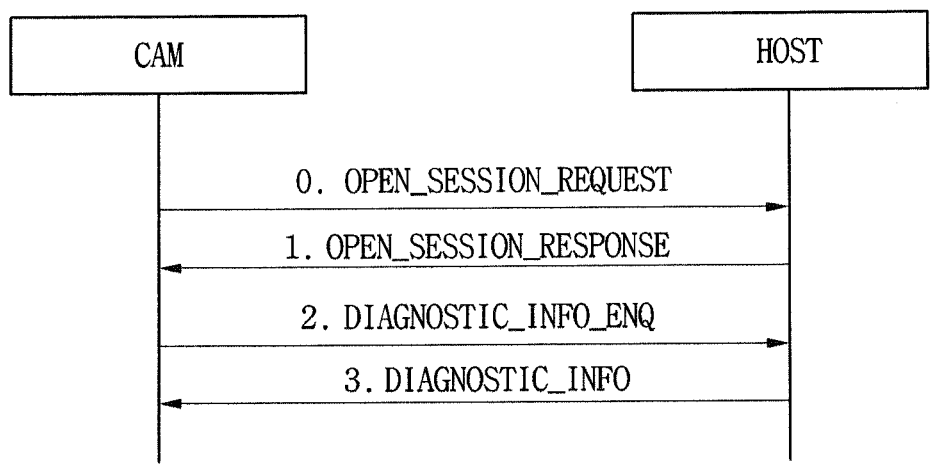
FIG. 28 represents an object interaction between the broadcast reception device and the CAM according to an embodiment.

FIG. 28 represents object interaction between the broadcast reception device and the CAM according to an embodiment.

As described in FIG. 25, the diagnostic information resource may be defined in order to request/reply the diagnostic information on the broadcast reception device 100, and the diagnostic information resource may include a diagnostic information request object and a diagnostic information request reply object.

When a session between the broadcast reception device 100 and the CAM 200 is linked, the CAM 200 may receive the diagnostic information request reply object from the broadcast reception device 100. In this case, the diagnostic information request reply object received by the CAM 200 may be a DIAGNOSTIC_INFO object. In this case, diagnostic information received by the CAM 200 may include at least one of the strength of a signal input to the broadcast reception device 100 and the status of the signal, a network status, and a video/audio transmission status.

FIG. 29 represents the syntax of the diagnostic information request reply object according to the embodiment of FIG. 28.

As shown in FIG. 29, the diagnostic information request reply object may include tag information for representing that a data unit includes the diagnostic information request reply object. In particular, the broadcast reception device 100 may identify, through the tag information, an object that the data unit includes. The tag information may have a different value for each object unit. The tag information representing that the data unit includes the diagnostic information request reply object may be a diagnostic_info_tag field. In a particular embodiment, the diagnostic_info_tag field may be 24 bits.

Also, the diagnostic information request reply object may include total length information on a data field in the data unit. The total length information on the data field may be a length_field.

Also, the diagnostic information request reply object may include information on whether the diagnostic information may be displayed on the broadcast reception device 100. The information on whether the diagnostic information may be displayed through the broadcast reception device 100 may be a screen_support_answ field. In a particular embodiment, the screen_support_answ field may be 8 bits.

In an embodiment, when the screen_support_answ field has a value of 00, it may represent that the broadcast reception device 100 does not support the displaying of the diagnostic information. In other words, it may represent that the broadcast reception device 100 does not show a screen related to the diagnostic information. Also, it may represent that the broadcast does not implement the screen related to the diagnostic information.

In another embodiment, when the screen_support_answ field has a value of 01, it may represent that the broadcast reception device 100 supports the displaying of the diagnostic information. In other words, it may represent that the broadcast reception device 100 shows the screen related to the diagnostic information.

Also, the diagnostic information request reply object may include information representing the strength of an RF signal. The information representing the strength of the RF signal may be a signal_strength field. In a particular embodiment, the signal_strength field may be 8 bits. In an embodiment, the information representing the strength of the RF signal may have a value between 0 and 100. In this case, when strength information on the RF signal is 0, it may represent that there is no signal. Also, when strength information on the RF signal is 100, it may represent that a signal having the maximum strength is being received.

Also, the diagnostic information request reply object may include information representing the quality of the RF signal. The information representing the quality of the RF signal may be a signal_quality field. In a particular embodiment, the signal_quality field may be 16 bits. In an embodiment, the information representing the quality of the RF signal may have a value between 0 and 100. In this case, when quality information on the RF signal is 0, it may represent that there is no signal. Also, when the quality information on the RF signal is 100, it may represent that a signal having the highest quality is being received.

Also, the diagnostic information request reply object may include information representing a video transmission status between the broadcast reception device 100 and the CAM 200. The information representing the video transmission status may be a video-check field. In a particular embodiment, the video-check field may be 8 bits. In an embodiment, when the information representing the video transmission status is 0, it may represent that there is no error in the video transmission status. Also, when the information representing the video transmission status has any value, it may represent that there is an error in the video transmission state. In a particular embodiment, any value may represent the error level of the video transmission status. Also, any value may also have another meaning according to the operation of the broadcast reception device 100.

Also, the diagnostic information request reply object may include information representing an audio transmission status between the broadcast reception device 100 and the CAM 200. The information representing the audio transmission status may be an audio-check field. In a particular embodiment, the audio-check field may be 8 bits. In an embodiment, when the information representing the audio transmission status is 0, it may represent that there is no error in the audio transmission status. Also, when the information representing the audio transmission status has any value, it may represent that there is an error in the audio transmission state. In a particular embodiment, any value may represent the error level of the audio transmission status. Also, any value may also have another meaning according to the operation of the broadcast reception device 100.

Also, the diagnostic information request reply object may include information representing the network status of the broadcast reception device 100. The information representing the network status may be a network_check field. In a particular embodiment, the network-check field may be 8 bits. In an embodiment, when the information representing the network status is 0, it may represent that there is no error in the network status. Also, when the information representing the network status has any value, it may represent that there is an error in the network status. In a particular embodiment, any value may represent the error level of the network status. Also, any value may also have another meaning according to the operation of the broadcast reception device 100.

FIG. 30 represents a resource including an object for diagnostic information on the broadcast reception device according to an embodiment. In particular, a resource for a MMI may include an object for diagnostic information on the broadcast reception device.

In this case, the object for the diagnostic information included in the MMI may include a diagnostic_info_enq object and a diagnostic_info object. Resource allocation values shown in FIG. 30 with respect to the object for the diagnostic information on the broadcast reception device 100 are only examples and other values may be allocated when being actually used.

Figure 31:
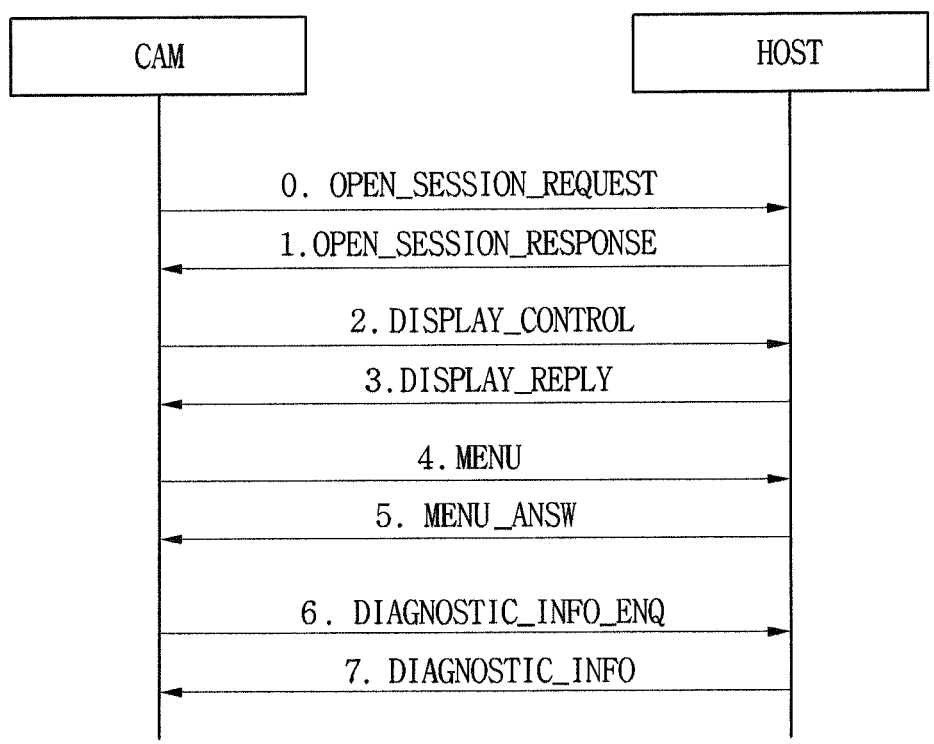
FIG. 31 represents an object interaction between the broadcast reception device and the CAM according to an embodiment.

FIG. 31 represents object interaction between the broadcast reception device and the CAM according to an embodiment.

As described in FIG. 30, a diagnostic information object may be defined in a resource for an MMI in order to request/reply diagnostic information on the broadcast reception device 100, and the diagnostic information object may include a diagnostic information request object and a diagnostic information request reply object.

When a session between the broadcast reception device 100 and the CAM 200 is linked, the CAM 200 may transmit the diagnostic information request object from the broadcast reception device 100. In this case, the diagnostic information request object transmitted by the CAM 200 may be a DIAGNOSTIC_INFO_ENQ object. In this case, a diagnostic information request transmitted by the CAM 200 may include at least one of the strength of a signal input to the broadcast reception device 100 and the status of the signal, a network status, and a video/audio transmission status.

Figure 32:
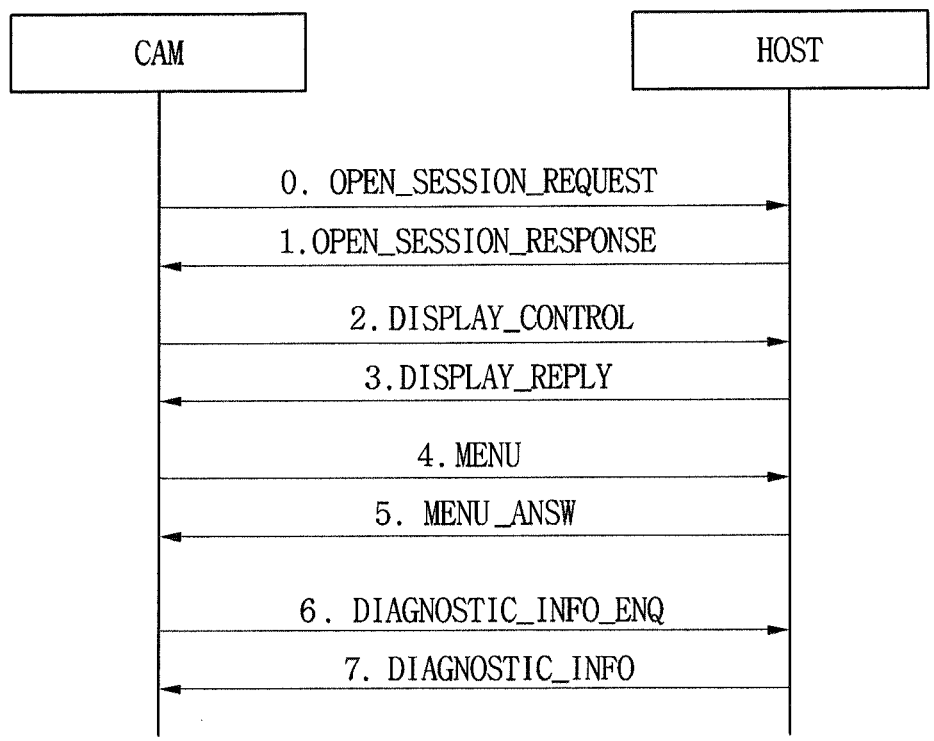
FIG. 32 represents an object interaction between the broadcast reception device and the CAM according to an embodiment.

FIG. 32 represents object interaction between the broadcast reception device and the CAM according to an embodiment.

As described in FIG. 30, a diagnostic information object may be defined in a resource for an MMI in order to request/reply diagnostic information on the broadcast reception device 100, and the diagnostic information object may include a diagnostic information request object and a diagnostic information request reply object. When a session between the broadcast reception device 100 and the CAM 200 is linked, the CAM 200 may receive the diagnostic information request reply object from the broadcast reception device 100. In this case, the diagnostic information request reply object received by the CAM 200 may be a DIAGNOSTIC_INFO object. In this case, a diagnostic information request reply received by the CAM 200 may include at least one of the strength of a signal input to the broadcast reception device 100 and the status of the signal, a network status, and a video/audio transmission status.

Figure 33:
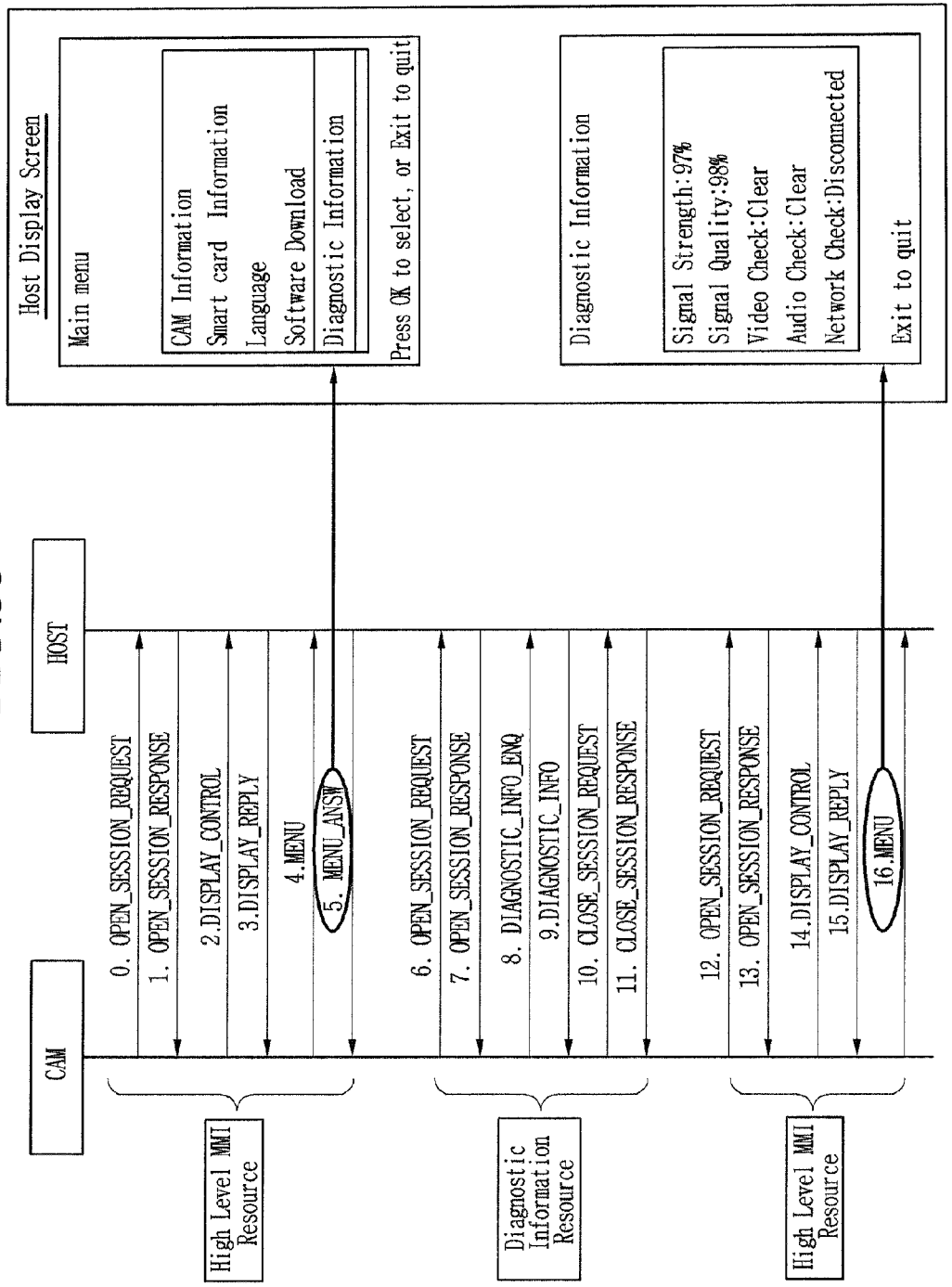
FIGS. 33 to 34 represent an object interaction flowchart between the broadcast reception device and the CAM according to an embodiment.
Figure 34:
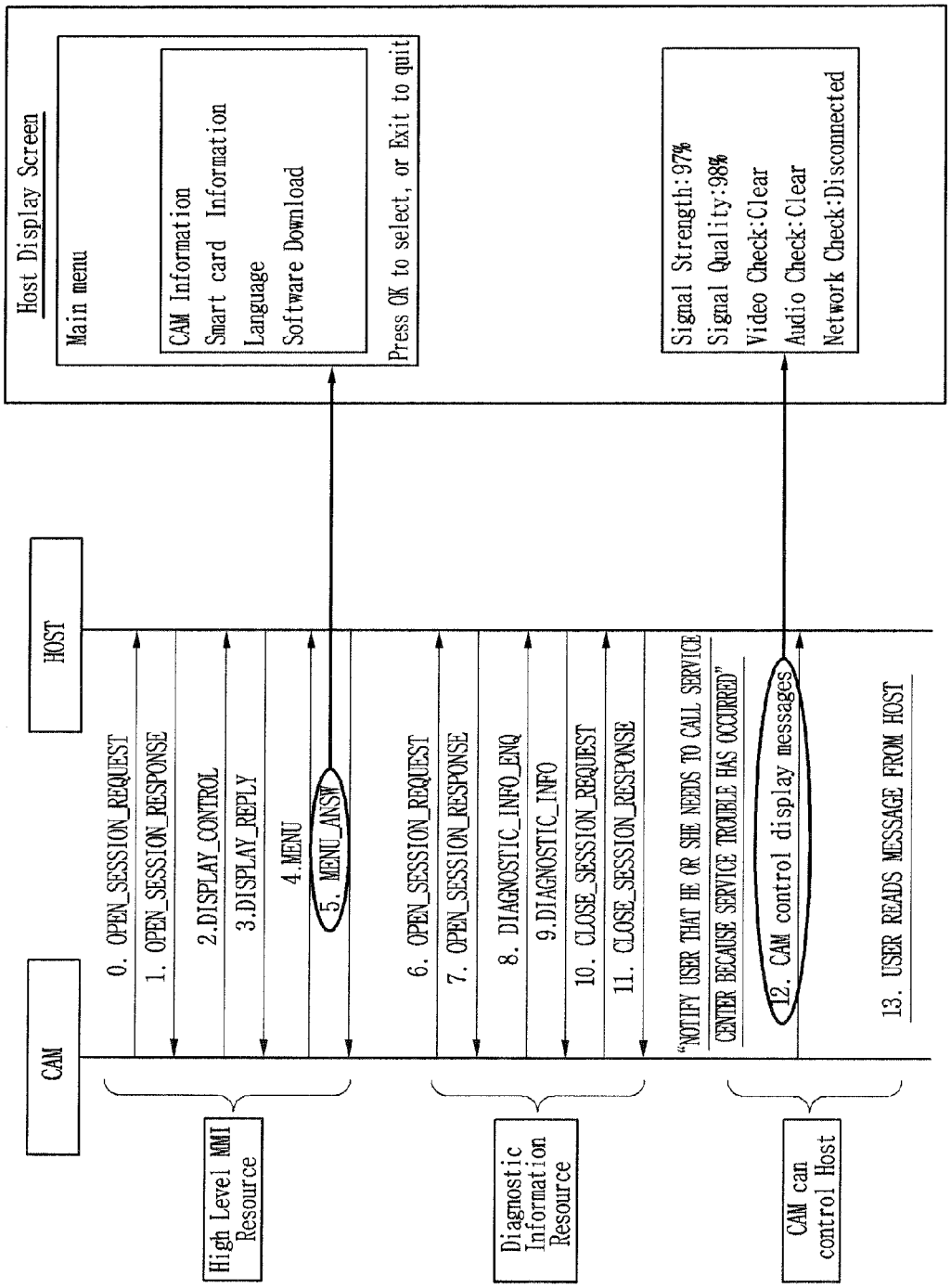

FIGS. 33 to 34 represent object interaction flowchart between the broadcast reception device and the CAM according to an embodiment. In the following, FIGS. 33 and 34 may be an operation flowchart that is based on a high-level MMI especially.

Initially, the CAM 200 requests a session open in order to use the resources of the broadcast reception device 100. In particular, a session requested by the CAM 200 may be a high-level MMI session. In this case, the high-level MMI session may be a session for transmitting/receiving a resource for the high-level MMI.

When receiving the request for the session open from the CAM 200, the broadcast reception device 100 transmits a response to the request. The broadcast reception device 100 and the CAM 200 may perform interaction through transmitting and receiving the object of the resource through an open session.

While the session is open, the CAM 200 requests graphic and display information from the broadcast reception device 100. In particular, the graphic and display information requested by the CAM 200 may be graphic and display information on the MMI. In addition, the broadcast reception device 100 provides the graphic and display information according to the request of the CAM 200.

The CAM 200 transmits a menu object to the broadcast reception device 100 based on the received graphic and display information. The menu object may be shown in the form of the main menu shown in FIG. 33.

The broadcast reception device 100 notifies the CAM 200 that a user has selected diagnostic information on the menu object. In a particular embodiment, the broadcast reception device 100 may show the menu object in the form of the main menu and notify the CAM that the diagnostic information has been selected from listed items, as shown in FIG. 33.

When the diagnostic information is selected as a reply to the menu object, the CAM 200 requests the broadcast reception device 100 to open a diagnostic information session. In the present embodiment, since a resource for the diagnostic information is defined separately from the MMI resource, an existing MMI interface session ends and a new session opens. The diagnostic information session may be a session for transmitting/receiving the resource for the diagnostic information. In addition, when the broadcast reception device 100 that has received the request for the diagnostic information session open from the CAM 200 transmits a response thereto, the diagnostic information session opens.

While the session opens, the CAM 200 requests diagnostic information from the broadcast reception device 100. In a particular embodiment, the CAM 200 may transmit a diagnostic information request object to the broadcast reception device 100.

The broadcast reception device 100 transmits a reply to the diagnostic information request received from the CAM 200. In this case, the reply to the diagnostic information request may include diagnostic information on the broadcast reception device 100 and information on whether it is possible to display the diagnostic information. In this case, the information on whether it is possible to display which is transmitted by the broadcast reception device 100 may be information on whether the broadcast reception device may display a diagnostic status.

In an embodiment, when the broadcast reception device 100 may display the diagnostic status, the broadcast reception device 100 and the CAM 200 may close the diagnostic information session and re-open the MMI session to display the diagnostic information on the broadcast reception device 100.

In another embodiment, it is possible to transmit, to the CAM, the fact that the broadcast reception device 100 may not display the diagnostic information, as shown in FIG. 34. In a particular embodiment, the broadcast reception device 100 may not display the diagnostic information. Also, the main menu displayed on the broadcast reception device 100 may not include an item for the diagnostic information.

In this case, the CAM 200 may transmit a diagnostic message directly to the broadcast reception device 100. A user may determine the status of the broadcast reception device 100 based on the diagnostic message received from the CAM 200.

Figure 35:
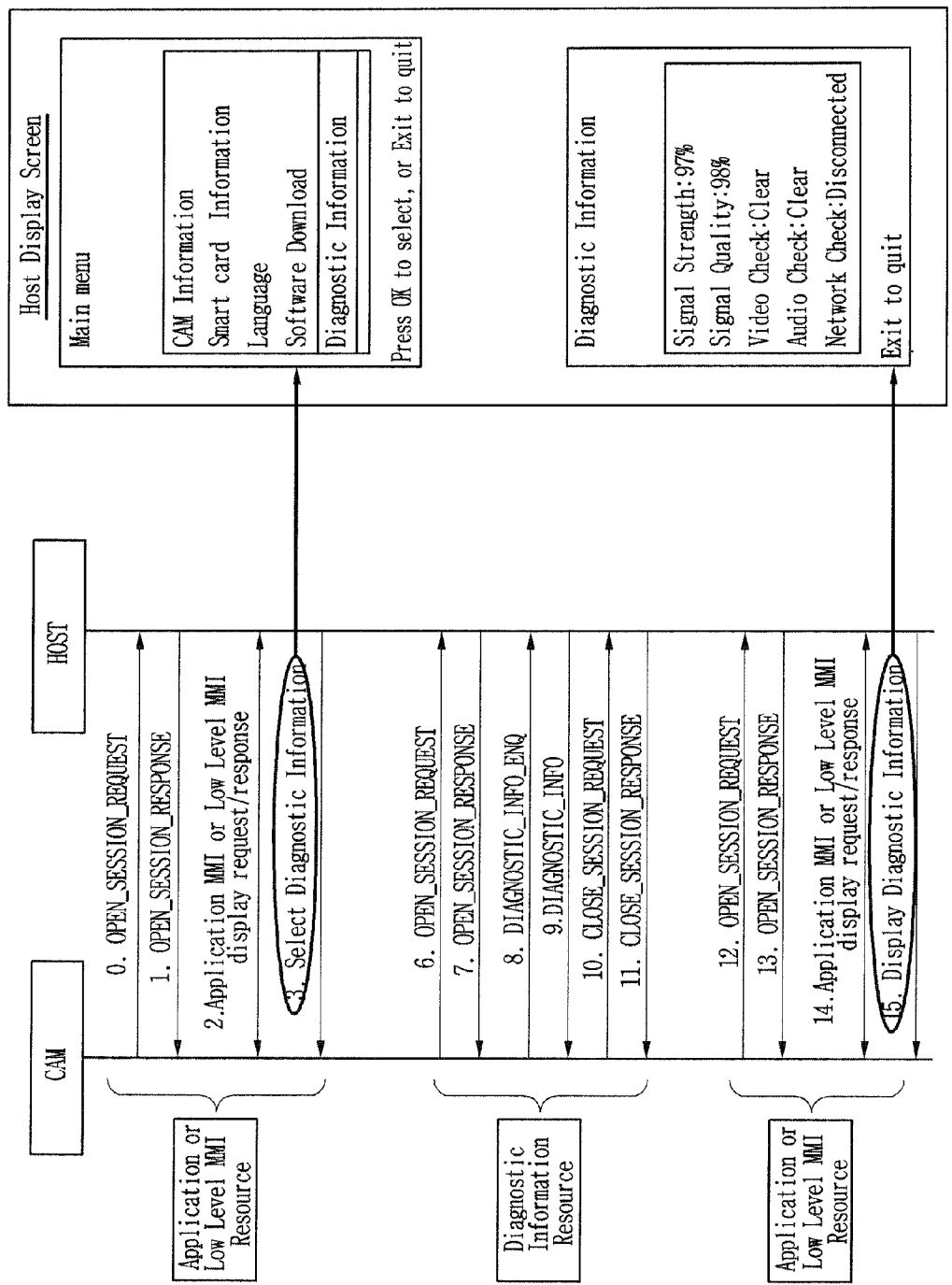
FIGS. 35 to 36 represent an object interaction flowchart between the broadcast reception device and the CAM according to an embodiment.
Figure 36:
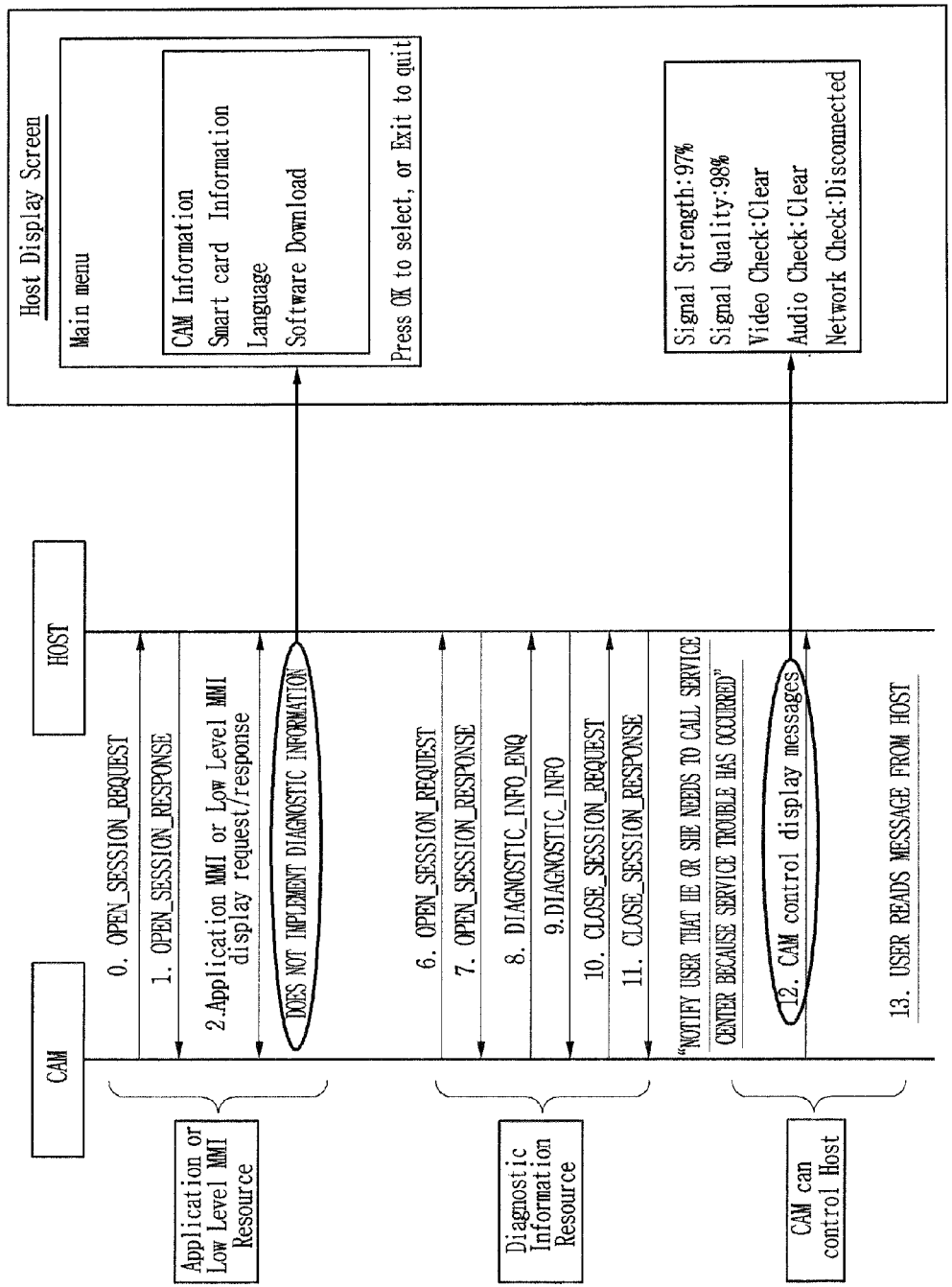

FIGS. 35 to 36 represent object interaction flowchart between the broadcast reception device and the CAM according to an embodiment. In the following, FIGS. 35 and 36 may be an operation flowchart that is especially based on a low-level MMI or an application MMI.

Initially, the CAM 200 requests a session open in order to transmit/receive a resource to/from the broadcast reception device 100. In particular, a session requested by the CAM 200 may be a low-level MMI session or an application MMI session.

When receiving the request for the session open from the CAM 200, the broadcast reception device 100 transmits a response to the request. The broadcast reception device 100 and the CAM 200 may perform interaction through transmitting and receiving the object of the resource through an open session.

While the session opens, the CAM 200 requests graphic and display information from the broadcast reception device 100. In particular, the graphic and display information requested by the CAM 200 may be graphic and display information on the MMI. In addition, the broadcast reception device 100 provides the graphic and display information according to the request of the CAM 200.

The broadcast reception device 100 transmits to the CAM 200 that a user has selected diagnostic information from among a plurality of listed selective items. In particular, the application of the CAM 200 on the low-level MMI may control a menu display method. Alternatively, the display application of the broadcast reception device 100 on the application MMI may control the menu display method. In addition, the broadcast reception device 100 may receive an input to the shown menu.

When the CAM 200 receives from the broadcast reception device 100 that the user has selected diagnostic information, the CAM 200 requests the broadcast reception device 100 to open a diagnostic information session. The diagnostic information session may be a session for transmitting/receiving a resource for the diagnostic information. In addition, when the broadcast reception device 100 that has received the request for the diagnostic information session open from the CAM 200 transmits a response thereto, the diagnostic information session opens.

While the session opens, the CAM 200 requests diagnostic information from the broadcast reception device 100. In a particular embodiment, the CAM 200 may transmit a diagnostic information request object to the broadcast reception device 100.

The broadcast reception device 100 transmits a reply to the diagnostic information request received from the CAM 200. In this case, the reply to the diagnostic information request may include diagnostic information on the broadcast reception device 100 and information on whether it is possible to display the diagnostic information. In this case, the information on whether it is possible to display which is transmitted by the broadcast reception device 100 may be information on whether the broadcast reception device may display a diagnostic status.

In an embodiment, when the broadcast reception device 100 may display the diagnostic status, the broadcast reception device 100 and the CAM 200 may close the diagnostic information session and re-open the MMI session to display the diagnostic information on the broadcast reception device 100. In this case, the MMI session to open may be a session for the low-level or application MMI.

In another embodiment, it is possible to transmit, to the CAM, the fact that the broadcast reception device 100 may not display the diagnostic information, as shown in FIG. 36. In a particular embodiment, a main menu that the broadcast reception device 100 displays may not include a diagnostic information item. In this case, the CAM 200 may transmit a diagnostic message directly to the broadcast reception device 100. A user may determine the status of the broadcast reception device 100 based on the diagnostic message received from the CAM 200.

Figure 37:
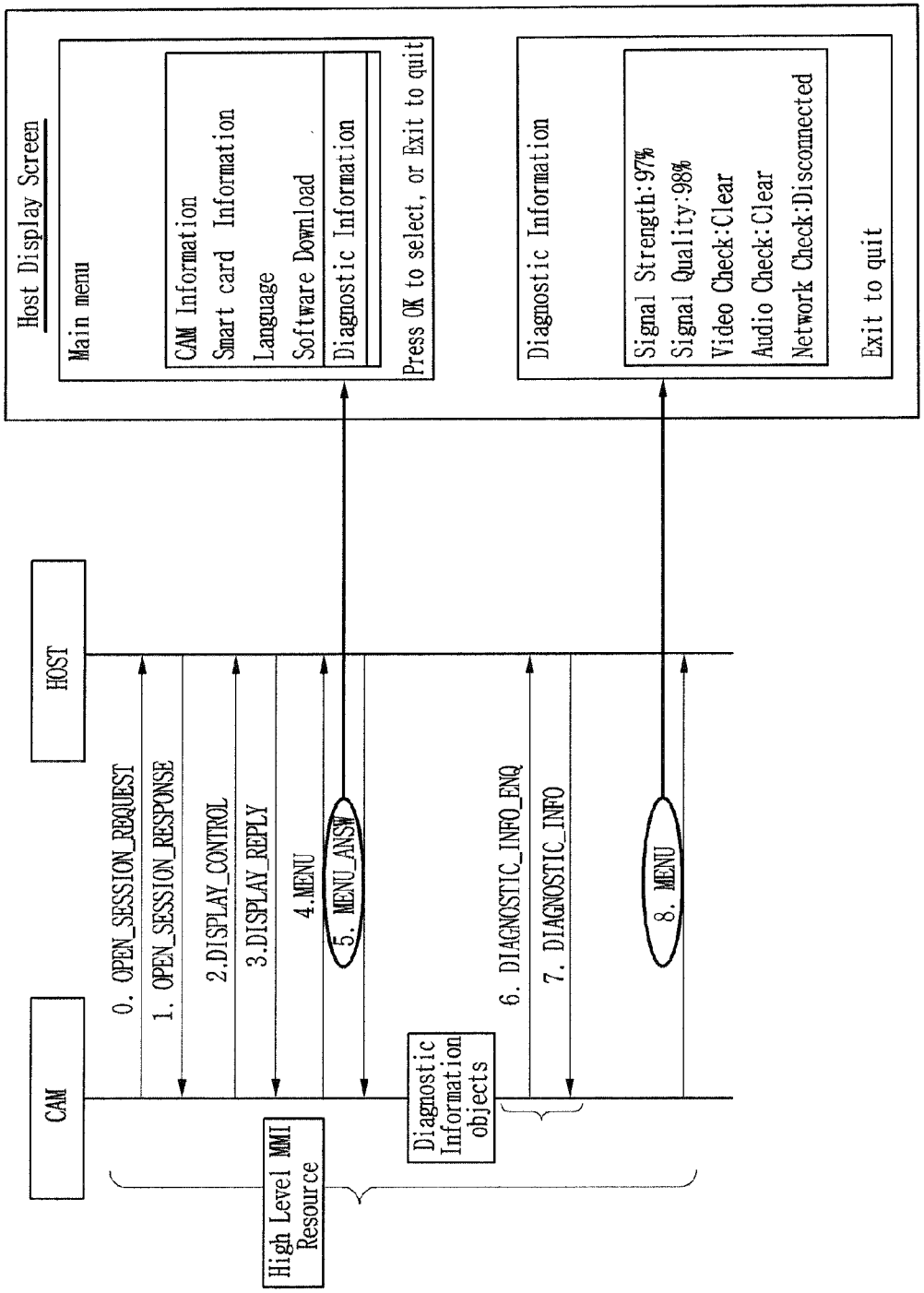
FIG. 37 represents an object interaction flowchart between the broadcast reception device and the CAM according to another embodiment.

FIG. 37 represents an object interaction flowchart between the broadcast reception device 100 and the CAM 200 according to another embodiment. The embodiment of FIG. 37 is an embodiment where a diagnostic information request/reply object is defined as an object of a high-level MMI resource.

The embodiment shown in FIG. 37 does not have the process of closing the MMI session and opening the diagnostic information session, unlike the embodiment shown in FIG. 33. In particular, a diagnostic information object is defined in the high-level MMI resource and initially, a high-level MMI interface session opens. In addition, a diagnostic information request and a reply to the diagnostic information request are performed between the broadcast reception device 100 and the CAM 200 in the high-level MMI session. In this case, since there is no process of closing the diagnostic information session and opening the high-level MMI, a case where the broadcast reception device 100 may not display the diagnostic information is not considered in the present embodiment.

Figure 38:
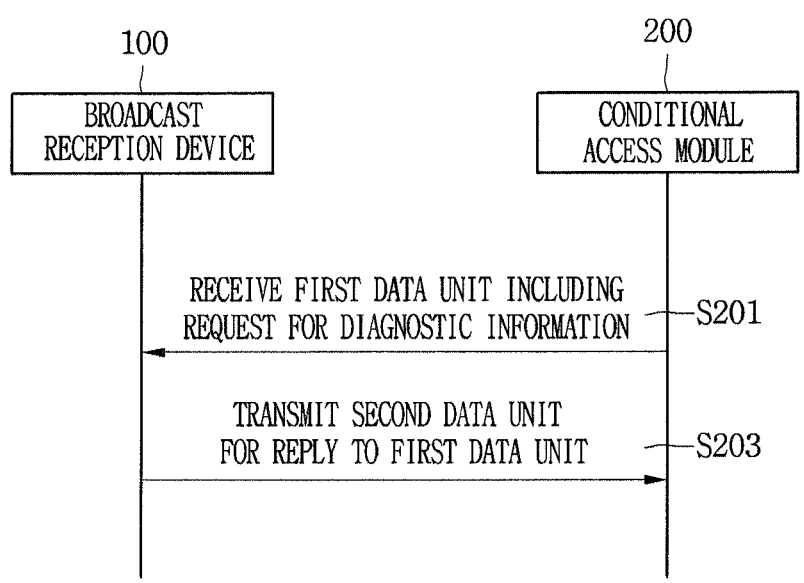
FIG. 38 is an operation flowchart of the broadcast reception device according to an embodiment.

FIG. 38 is an operation flowchart of the broadcast reception device according to an embodiment.

The broadcast reception device 100 receives a first data unit including a diagnostic information related request from the CAM 200 in step S201. In this case, the diagnostic information related request may be the form of an object.

In an embodiment, the diagnostic information related request may be related to whether the broadcast reception device 100 supports the displaying of the diagnostic information. In particular, it may be related to whether the broadcast reception device 100 implements a screen related to the diagnostic information. In this case, the screen related to the diagnostic information may be a MMI showing the diagnostic information. Also, the screen related to the diagnostic information may be a MMI showing a plurality of items including a diagnostic information item. Also, the screen related to the diagnostic information may be a diagnostic information message.

In another embodiment, a diagnostic information related request may be a request for diagnostic information display by the broadcast reception device 100. In particular, it may be related to what the CAM 200 requests the broadcast reception device 100 to display the screen related to the diagnostic information. In this case, the request for the displaying of the screen related to the diagnostic information may be a request for the displaying of the screen related to the diagnostic information that the CAM 200 transmits to the broadcast reception device 100. In a particular embodiment, the CAM 200 may request the broadcast reception device 100 to display the screen related to the diagnostic information. Also, the CAM 200 may request the broadcast reception device 100 to stop displaying the screen related to the diagnostic information.

In another embodiment, a diagnostic information related request may be a request for diagnostic information on the broadcast reception device 100. In particular, the diagnostic information related request may be a request for system diagnosis information on the broadcast reception device 100.

In this case, each request may be transmitted through a data unit in the form of an object. The broadcast reception device 100 may identify each request based on the tag information in the data unit.

The broadcast reception device 100 transmits a second data unit for a reply to a first data unit received from the CAM 200 in step S203. In particular, the broadcast reception device 100 transmits a reply to a diagnostic information request, in the form of an object to the communication interface unit 211 of the CAM 200 through the communication interface unit 157.

In an embodiment, a diagnostic information reply may be related to whether the broadcast reception device 100 supports the displaying of a diagnostic information related screen. In an embodiment, the diagnostic information reply may be related to whether the broadcast reception device 100 implements the diagnostic information related screen. In this case, the diagnostic information reply may be information representing that the broadcast reception device 100 does not implement the diagnostic information related screen.

In another embodiment, the diagnostic information reply may include information on the showing status of the diagnostic information screen that the broadcast reception device 100 shows. In a particular embodiment, the diagnostic information reply may represent that the broadcast reception device 100 is displaying the diagnostic information related screen. Also, the diagnostic information reply may represent that the broadcast reception device 100 is not displaying the diagnostic information related screen.

In another embodiment, the diagnostic information reply may be relayed to system diagnosis information on the broadcast reception device 100. In a particular embodiment, the diagnostic information reply may include at least one of strength information on a broadcast signal received by the broadcast reception device 100, quality information on the broadcast signal, video path status information between the broadcast reception device 100 and the CAM 200, video system status information on the broadcast reception device 100, audio path status information between the broadcast reception device 100 and the CAM 200, audio system status information on the broadcast reception device 100, and network status information on the broadcast reception device 100.

The broadcast reception device, the operating method of the broadcast reception device, the CAM and the operating method of the CAM according to the embodiments may manage status information on the MMI.

The broadcast reception device, the operating method of the broadcast reception device, the CAM and the operating method of the CAM according to the embodiments may transmit, to the CAM, status information on the broadcast reception device.

The characteristics, structures, and effects described in the embodiments above are included in at least one embodiment but are not limited to one embodiment. Furthermore, the characteristic, structure, and effect illustrated in each embodiment may be combined or modified for other embodiments by a person skilled in the art. Thus, it would be construed that contents related to such a combination and such a variation are included in the scope of embodiments.

Embodiments are mostly described above. However, they are only examples and do not limit the present disclosure. A person skilled in the art may appreciate that many variations and applications not presented above may be implemented without departing from the essential characteristic of embodiments. For example, each component particularly represented in embodiments may vary. In addition, it should be construed that differences related to such a variation and such an application are included in the scope of the present disclosure defined in the following claims.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A broadcast reception device connected to a conditional access module (CAM) for descrambling scrambled broadcast content, the broadcast reception device comprising:
a communication interface configured to receive, from the CAM, a first data unit comprising a request for diagnostic information for representing a status of the broadcast reception device; and
a controller configured to:
generate a second data unit comprising a reply to the first data unit, and
transmit the second data unit to the CAM through the communication interface, wherein the request comprises at least one of a request for displaying a diagnostic information related screen and a request for stopping the displaying of the diagnostic information related screen, wherein the second data unit comprises information representing whether the broadcast reception device supports displaying the diagnostic information related screen, wherein the reply comprises information on a showing status of the diagnostic information related screen shown by the broadcast reception device, and wherein the showing status information is at least one of information representing that the broadcast reception device is displaying the diagnostic information related screen and information representing that the broadcast reception device is not displaying the diagnostic information related screen.

2. The broadcast reception device according to claim 1, wherein the reply to the first data unit comprises system diagnosis information on the broadcast reception device, and wherein the system diagnosis information on the broadcast reception device is at least one of strength information on a signal that the broadcast reception device receives, quality information on the signal that the broadcast reception device receives, video system status information on the broadcast reception device, audio system status information on the broadcast reception device, and network status information on the broadcast reception device.

3. The broadcast reception device according to claim 1, wherein the communication interface receives, from the CAM, a third data unit comprising data for a request for displaying of a plurality of items, and wherein the controller receives a user input for a reply to the third data unit and transmits a fourth data unit comprising the received user input to the CAM through the communication interface.

4. The broadcast reception device according to claim 3, wherein the user input is an input selecting diagnostic information.

5. The broadcast reception device according to claim 3, wherein a session between the broadcast reception device and the CAM for transmitting and receiving the first data unit and the second data unit is a same as a session between the broadcast reception device and the CAM for transmitting and receiving the third data and the fourth data.

6. The broadcast reception device according to claim 3, wherein a session between the broadcast reception device and the CAM for transmitting and receiving the first data unit and the second data unit is different from a session between the broadcast reception device and the CAM for transmitting and receiving the third data and the fourth data.

7. The broadcast reception device according to claim 1, wherein the first data unit further comprises data for requesting information on a processing status of a function requested to be processed by the CAM, wherein the second data unit further comprises information on a processing status of a function requested to be processed, by the CAM.

8. The broadcast reception device according to claim 7, wherein the processing status information on the function requested to be processed by the CAM is at least one of information representing that the broadcast reception device has succeeded in processing the function requested to be processed by the CAM, information representing that the broadcast reception device is processing the function requested to be processed by the CAM, and information representing that the broadcast reception device fails to process the function requested to be processed by the CAM.

9. An operating method of a broadcast reception device connected to a conditional access module (CAM) for descrambling scrambled broadcast content, the operating method comprising:

receiving, from the CAM, a first data unit comprising a request for diagnostic information for representing a status of the broadcast reception device;

generating a second data unit comprising a reply to the first data unit; and transmitting the second data unit to the CAM, wherein the request comprises at least one of a request for displaying a diagnostic information related screen and a request for stopping the displaying of the diagnostic information related screen, wherein the second data unit comprises information representing whether the broadcast reception device supports displaying the diagnostic information related screen, wherein the reply comprises information on a showing status of the diagnostic information related screen shown by the broadcast reception device, and wherein the showing status information is at least one of information representing that the broadcast reception device is displaying the diagnostic information related screen and information representing that the broadcast reception device is not displaying the diagnostic information related screen.

10. The operating method according to claim 9, wherein the reply to the first data unit comprises system diagnosis information on the broadcast reception device, and wherein the system diagnosis information on the broadcast reception device is at least one of strength information on a signal that the broadcast reception device receives, quality information on the signal that the broadcast reception device receives, video system status information on the broadcast reception device, audio system status information on the broadcast reception device, and network status information on the broadcast reception device.

11. The operating method according to claim 9, further comprising:

receiving, from the CAM, a third data unit comprising data for a request for displaying a plurality of items;

receiving a user input for a reply to the third data unit; and transmitting, to the CAM, a fourth data unit comprising the received user input.

12. The operating method according to claim 9, wherein the first data unit further comprises data for requesting information on a processing status of a function requested to be processed by the CAM, and wherein the second data unit further comprises information on a processing status of a function requested to be processed by the CAM.

* * * * *